(12) United States Patent
Hougland et al.

(10) Patent No.: US 8,751,387 B2
(45) Date of Patent: *Jun. 10, 2014

(54) PAYMENT APPLICATION FRAMEWORK

(75) Inventors: Damon Charles Hougland, San Jose, CA (US); Musaab At-Taras, San Jose, CA (US); Jason Alexander Korosec, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/572,125

(22) Filed: Oct. 1, 2009

(65) Prior Publication Data

US 2010/0063924 A1     Mar. 11, 2010

Related U.S. Application Data

(63) Continuation of application No. 12/207,383, filed on Sep. 9, 2008.

(51) Int. Cl.
  *G06Q 40/00* (2012.01)
  *G06Q 20/00* (2012.01)
  G06Q 40/02 (2012.01)
  G06Q 20/10 (2012.01)

(52) U.S. Cl.
  CPC .............. *G06Q 40/00* (2013.01); *G06Q 20/00* (2013.01); *G06Q 40/02* (2013.01); *G06Q 20/102* (2013.01); *G06Q 20/108* (2013.01); *G06Q 20/10* (2013.01)
  USPC ............... 705/40; 705/35; 705/39; 705/42

(58) Field of Classification Search
  CPC ....... G06Q 40/00; G06Q 40/02; G06Q 20/00; G06Q 20/102; G06Q 20/10; G06Q 20/108
  USPC .......................... 705/42, 35, 39, 40
  See application file for complete search history.

(56) References Cited

U.S. PATENT DOCUMENTS

| 3,983,481 A | 9/1976 | Nutt et al. |
| 5,715,314 A | 2/1998 | Payne et al. |

(Continued)

FOREIGN PATENT DOCUMENTS

| CA | 2306521 A1 | 10/2001 |
| CN | 102209972 A | 10/2011 |

(Continued)

OTHER PUBLICATIONS

Wadhwa, D., Leavins, J. R., & Foster, R. (2002). New Developments in Reporting Third-Party Payments to Attorneys. Allied Academies International Conference.Academy of Accounting and Financial Studies.Proceedings, 7(2), 61-66. Retrieved Nov. 14, 2013.*

(Continued)

*Primary Examiner* — Kito R Robinson
(74) *Attorney, Agent, or Firm* — Schwegman Lundberg & Woessner, P.A.

(57) ABSTRACT

Embodiments of the present invention provide a payment application framework. In an example embodiment, a request at a payment facilitator is received. The request is for a split payment to a plurality of receiving parties. The request is processed to establish one or more payment transactions. A single transfer of funds is sent from an account of a sender to at least one account of a receiving party of the plurality of receiving parties.

22 Claims, 15 Drawing Sheets

(56) References Cited

U.S. PATENT DOCUMENTS

| | | | |
|---|---|---|---|
| 5,778,178 | A | 7/1998 | Arunachalam |
| 5,864,830 | A | 1/1999 | Armetta et al. |
| 5,884,280 | A | 3/1999 | Yoshioka et al. |
| 5,892,900 | A | 4/1999 | Ginter et al. |
| 5,903,721 | A | 5/1999 | Sixtus |
| 5,905,736 | A | 5/1999 | Ronen et al. |
| 5,953,710 | A | 9/1999 | Fleming |
| 5,960,411 | A | 9/1999 | Hartman et al. |
| 5,987,500 | A | 11/1999 | Arunachalam |
| 6,029,147 | A | 2/2000 | Horadan et al. |
| 6,044,360 | A | 3/2000 | Picciallo |
| 6,212,556 | B1 | 4/2001 | Arunachalam |
| 6,219,650 | B1 | 4/2001 | Friend et al. |
| 6,235,176 | B1 | 5/2001 | Schoen et al. |
| 6,311,170 | B1* | 10/2001 | Embrey ........................ 705/40 |
| 6,324,523 | B1 | 11/2001 | Killeen, Jr. et al. |
| 6,327,578 | B1 | 12/2001 | Linehan |
| 6,338,047 | B1 | 1/2002 | Wallman |
| 6,522,395 | B1 | 2/2003 | Bamji et al. |
| 6,578,014 | B1 | 6/2003 | Murcko, Jr. |
| 6,604,086 | B1 | 8/2003 | Kolls |
| 6,615,183 | B1 | 9/2003 | Kolls |
| 6,622,128 | B1 | 9/2003 | Bedell et al. |
| 6,629,080 | B1 | 9/2003 | Kolls |
| 6,736,314 | B2 | 5/2004 | Cooper et al. |
| 6,796,497 | B2 | 9/2004 | Benkert et al. |
| 6,839,689 | B2 | 1/2005 | Aieta et al. |
| 6,882,979 | B1 | 4/2005 | Reay et al. |
| 6,886,741 | B1 | 5/2005 | Salveson |
| 6,983,261 | B1* | 1/2006 | Francisco et al. ............... 705/39 |
| 7,092,913 | B2 | 8/2006 | Cannon, Jr. |
| 7,103,576 | B2 | 9/2006 | Mann, III et al. |
| 7,158,753 | B2 | 1/2007 | Kagan et al. |
| 7,343,335 | B1 | 3/2008 | Olliphant |
| 7,356,507 | B2 | 4/2008 | Bezos et al. |
| 7,398,252 | B2* | 7/2008 | Neofytides et al. ............. 705/64 |
| 7,734,545 | B1* | 6/2010 | Fogliano et al. ................ 705/40 |
| 7,909,237 | B2 | 3/2011 | Tredeau et al. |
| 7,925,591 | B2 | 4/2011 | Gajjala et al. |
| 2002/0002513 | A1* | 1/2002 | Chiasson ........................ 705/27 |
| 2002/0016765 | A1 | 2/2002 | Sacks |
| 2002/0029339 | A1* | 3/2002 | Rowe ........................... 713/182 |
| 2002/0052841 | A1 | 5/2002 | Guthrie et al. |
| 2002/0095372 | A1 | 7/2002 | Likourezos et al. |
| 2002/0095376 | A1 | 7/2002 | Likourezos et al. |
| 2002/0095377 | A1 | 7/2002 | Likourezos et al. |
| 2002/0116329 | A1 | 8/2002 | Serbetcioglu et al. |
| 2002/0128932 | A1 | 9/2002 | Yung et al. |
| 2002/0143647 | A1 | 10/2002 | Headings et al. |
| 2002/0152176 | A1* | 10/2002 | Neofytides et al. ............. 705/64 |
| 2002/0152179 | A1 | 10/2002 | Racov |
| 2002/0169662 | A1 | 11/2002 | Claiborne |
| 2002/0198847 | A1 | 12/2002 | Fahraeus |
| 2003/0032409 | A1 | 2/2003 | Hutcheson et al. |
| 2003/0097331 | A1 | 5/2003 | Cohen |
| 2003/0120505 | A1 | 6/2003 | Spiegel |
| 2003/0135470 | A1 | 7/2003 | Beard |
| 2003/0163418 | A1* | 8/2003 | Marks ........................... 705/39 |
| 2003/0220835 | A1 | 11/2003 | Barnes, Jr. |
| 2004/0030601 | A1 | 2/2004 | Pond et al. |
| 2004/0039694 | A1 | 2/2004 | Dunn et al. |
| 2004/0058694 | A1 | 3/2004 | Mendiola et al. |
| 2004/0103060 | A1 | 5/2004 | Foth et al. |
| 2004/0148254 | A1 | 7/2004 | Hauser |
| 2004/0210517 | A1 | 10/2004 | Brooks et al. |
| 2005/0096977 | A1 | 5/2005 | Rossides |
| 2006/0036541 | A1 | 2/2006 | Schleicher |
| 2006/0064378 | A1 | 3/2006 | Clementz et al. |
| 2006/0167791 | A1 | 7/2006 | Hahn-Carlson |
| 2006/0173778 | A1 | 8/2006 | Lipsky et al. |
| 2006/0206425 | A1 | 9/2006 | Sharma |
| 2006/0224508 | A1 | 10/2006 | Fietz |
| 2006/0229998 | A1 | 10/2006 | Harrison et al. |
| 2007/0005432 | A1 | 1/2007 | Likourezos et al. |
| 2007/0118476 | A1 | 5/2007 | Likourezos et al. |
| 2007/0156580 | A1 | 7/2007 | Imrey et al. |
| 2008/0059366 | A1 | 3/2008 | Fou |
| 2008/0140564 | A1* | 6/2008 | Tal et al. ........................ 705/39 |
| 2008/0140577 | A1* | 6/2008 | Rahman et al. ................. 705/71 |
| 2008/0162340 | A1 | 7/2008 | Zimmer et al. |
| 2008/0195510 | A1 | 8/2008 | Olliphant |
| 2008/0249931 | A1* | 10/2008 | Gilder et al. ................... 705/39 |
| 2009/0119207 | A1* | 5/2009 | Grecia ........................... 705/40 |
| 2009/0144193 | A1* | 6/2009 | Giordano et al. ............... 705/39 |
| 2009/0248584 | A1* | 10/2009 | Eduardo et al. ................ 705/79 |
| 2009/0265252 | A1* | 10/2009 | Fletcher ......................... 705/26 |
| 2010/0010906 | A1* | 1/2010 | Grecia ........................... 705/21 |
| 2010/0063926 | A1 | 3/2010 | Hougland et al. |
| 2010/0191645 | A1 | 7/2010 | Hougland et al. |
| 2012/0246080 | A1* | 9/2012 | Bajan ............................ 705/71 |
| 2012/0271707 | A1 | 10/2012 | Harrison et al. |

FOREIGN PATENT DOCUMENTS

| | | |
|---|---|---|
| EP | 1081617 A2 | 3/2001 |
| EP | 1291673 A2 | 3/2003 |
| JP | 9073487 A | 3/1997 |
| JP | 1145298 A | 2/1999 |
| JP | 2000250979 A | 9/2000 |
| JP | 2002352086 A | 12/2002 |
| KR | 1020000063805 | 11/2000 |
| KR | 1020040010510 | 1/2004 |
| WO | WO-2006034265 A2 | 3/2006 |
| WO | WO-2006034265 A3 | 3/2006 |
| WO | WO-2006105202 A2 | 10/2006 |
| WO | WO-2006105202 A3 | 10/2006 |
| WO | WO-2006105202 B1 | 10/2006 |
| WO | WO-2010030672 A1 | 3/2010 |

OTHER PUBLICATIONS

"Amazon Flexible Payments Service (Amazon FPS)", [Online]. Retrieved from the Internet: <URL: https://payments.amazon.com/sdui/sdui/business?sn=devfps/o>, (2009), 4 pgs.

"U.S. Appl. No. 09/633,962 Response filed Oct. 28, 2004 to Non Final Office Action mailed Sep. 14, 2004", 16 pgs.

"U.S. Appl. No. 09/633,962, Final Office Action mailed Feb. 7, 2005", 13 pgs.

"U.S. Appl. No. 09/633,962, Non Final Office Action mailed Feb. 16, 2006", 11 pgs.

"U.S. Appl. No. 09/633,962, Non Final Office Action mailed Sep. 14, 2004", 13 pgs.

"U.S. Appl. No. 09/633,962, Response filed Apr. 17, 2006 to Non Final Office Action mailed Feb. 16, 2006", 2 pgs.

"U.S. Appl. No. 10/946,710, Advisory Action mailed Jul. 31, 2007", 3 pgs.

"U.S. Appl. No. 10/946,710, Final Office Action mailed Jan. 24, 2007", 7 pgs.

"U.S. Appl. No. 10/946,710, Non Final Office Action mailed May 18, 2006", 5 pgs.

"U.S. Appl. No. 10/946,710, Response filed Feb. 28, 2007 to Final Office Action mailed Jan. 24, 2007", 10 pgs.

"U.S. Appl. No. 10/946,710, Response filed Oct. 18, 2006 to Non Final Office Action mailed May 18, 2006", 8 pgs.

"U.S. Appl. No. 12/207,383, Final Office Action mailed Dec. 24, 2009", 16 pgs.

"U.S. Appl. No. 12/207,383, Non-Final Office Action mailed Jun. 25, 2009", 16 pgs.

"U.S. Appl. No. 12/207,383, Response filed Sep. 25, 2009 to Non Final Office Action mailed Jun. 25, 2009", 13 pgs.

"International Application Serial No. PCT/US2009/056367, Search Report mailed Dec. 15, 2009", 5 pgs.

"International Application Serial No. PCT/US2009/056367, Written Opinion mailed Dec. 15, 2009.", 12 pgs.

"U.S. Appl. No. 12/207,383, Non Final Office Action mailed Dec. 22, 2010", 16 pgs.

"U.S. Appl. No. 12/207,383, Response filed Mar. 24, 2010 to Final Office Action mailed Dec. 24, 2009", 12 pgs.

"U.S. Appl. No. 12/207,383, Response filed Aug. 2, 2011 to Final Office Action mailed Jun. 9, 2011", 12 pgs.

(56) References Cited

OTHER PUBLICATIONS

"U.S. Appl. No. 12/752,985, Response filed Dec. 21, 2011 to Non Final Office Action mailed Sep. 23, 2011", 10 pgs.
"U.S. Appl. No. 12/752,985, Non Final Office Action mailed Sep. 23, 2011", 12 pgs.
"European Application Serial No. 09813539.5, Extended Search Report mailed Nov. 25, 2011", 4 pgs.
"U.S. Appl. No. 12/752,985, Final Office Action mailed Mar. 9, 2012", 11 pgs.
"Australian Application Serial No. 2009291867, Office Action mailed Apr. 13, 2012", 3 pgs.
"Canadian Application Serial No. 2,736,489, Voluntary Amendment filed May 13, 2011", 4 pgs.
"Indian Application Serial No. 1890/CHENP/2011, Amendment filed May 9, 2011", 5 pgs.
"South African Application Serial No. 2011/01819, Amendment filed Jun. 6, 2011", 13 pgs.
"U.S. Appl. No. 12/207,383, Final Office Action mailed Jun. 9, 2011", 17 pgs.
"U.S. Appl. No. 12/207,383, Response filed Mar. 22, 2011 to Non-Final Office ActionReceived Dec. 22, 2010", 14 pgs.
"International Application Serial No. PCT/US2009/056367, International Preliminary Report on Patentability mailed Mar. 24, 2011", 14 pgs.
"U.S. Appl. No. 11/095,411, Advisory Action mailed Sep. 8, 2011", 3 pgs.
"U.S. Appl. No. 11/095,411, Advisory Action mailed Nov. 19, 2009", 4 pgs.
"U.S. Appl. No. 11/095,411, Appeal Brief filed Dec. 12, 2011", 34 pgs.
"U.S. Appl. No. 11/095,411, Examiner's Answer to Appeal Brief mailed Jan. 30, 2012", 30 pgs.
"U.S. Appl. No. 11/095,411, Final Office Action mailed Jun. 18, 2010", 16 pgs.
"U.S. Appl. No. 11/095,411, Final Office Action mailed Jul. 13, 2011", 24 pgs.
"U.S. Appl. No. 11/095,411, Final Office Action mailed Aug. 28, 2009", 17 pgs.
"U.S. Appl. No. 11/095,411, Non Final Office Action mailed Mar. 7, 2011", 20 pgs.
"U.S. Appl. No. 11/095,411, Non-Final Office Action mailed Feb. 27, 2009", 13 pgs.
"U.S. Appl. No. 11/095,411, Non-Final Office Action mailed Dec. 28, 2009", 15 pgs.
"U.S. Appl. No. 11/095,411, Pre-Appeal Brief Request Oct. 10, 2011", 5 pgs.
"U.S. Appl. No. 11/095,411, Preliminary Amendment filed Feb. 23, 2007", 11 pgs.
"U.S. Appl. No. 11/095,411, Preliminary Amendment filed Aug. 25, 2005", 8 pgs.
"U.S. Appl. No. 11/095,411, Response filed Mar. 29, 2010 to Non Final Office Action mailed Dec. 28, 2009", 13 pgs.
"U.S. Appl. No. 11/095,411, Response filed May 27, 2009 to Non Final Office Action mailed Feb. 27, 2009", 14 pgs.
"U.S. Appl. No. 11/095,411, Response filed Jun. 2, 2011 to Non-Final Office Action mailed Mar. 7, 2011", 20 pgs.
"U.S. Appl. No. 11/095,411, Response filed Aug. 25, 2011 to Final Office Action mailed Jul. 13, 2011", 21 pgs.
"U.S. Appl. No. 11/095,411, Response filed Oct. 18, 2010 to Final Office Action mailed Jun. 18, 2010", 14 pgs.
"U.S. Appl. No. 11/095,411, Response filed Oct. 28, 2009 to Final Office Action mailed Aug. 28, 2009", 13 pgs.
"U.S. Appl. No. 12/752,985, Non Final Office Action mailed Jul. 23, 2012", 11 pgs.
"U.S. Appl. No. 12/752,985, Response filed Jun. 11, 2012 to Final Office Action mailed Mar. 9, 2012", 9 pgs.
"U.S. Appl. No. 12/752,985, Response filed Oct. 12, 2012 to Non Final Office Action mailed Jul. 23, 2012", 12 pgs.
"U.S. Appl. No. 13/535,189, Non Final Office Action mailed Aug. 17, 2012", 24 pgs.

"Australian U.S. Appl. No. 11/493,112, First Examiner Report mailed Mar. 10, 2009", 2 pgs.
"Australian Application Serial No. 2006230277, Response filed Jan. 8, 2010 to First Examiner Report mailed Mar. 10, 2009", 17 pgs.
"Australian Application Serial No. 2010201969, Office Action Response filed Feb. 15, 2012", 18 pgs.
"Australian Application Serial No. 2010201969, First Examiner Report mailed Mar. 16, 2011", 2 Pgs.
"Chinese Application Serial No. 200680014449.7, Office Action mailed Jul. 29, 2010", with English translation of claims, 11 pgs.
"Chinese Application Serial No. 200680014449.7, Response filed Dec. 13, 2010 to Non Final Office Action mailed Jul. 29, 2010", with English translation of claims, 14 pgs.
"Chinese Application Serial No. 200980144630.3 Office Action mailed May 31, 2012", with English translation of claims, 9 pgs.
"Chinese Application Serial No. 200680014449.7, Office Action mailed Mar. 15, 2011", with English translation of claims, 14 pgs.
"European Application Serial No. 06739940.2, Extended European Search Report Mailed Dec. 21, 2009", 4 pgs.
"European Application Serial No. 09813539.5-2221, Response filed Jun. 6, 2012 to Extended European Search Report mailed Nov. 25, 2011", 14 pgs.
"International Application Serial No. PCT/US2006/011475, International Search Report mailed Dec. 12, 2006", 6 pgs.
"Korean Application Serial No. 2011-7008082, Office Action mailed Sep. 18, 2012", With English Translation, 16 pgs.
"The Authoritative Dictionary of IEEE Standards Terms", IEEE 100, Seventh Edition IEEE Standards Information Network/IEEE Press, (Dec 1, 2000), 37 pgs.
"Using your Cellphone as a Credit Card", The Wall Street Journal Online. WSJ.com, [Online]. Retrieved from the Internet: <URL: http://pqasb.pqarchiver.com/wsj/access/983215801. html?dids=983215801:983215801&FMT=FT&FMTS=>, (Feb. 8, 2006), 2 pgs.
Arrington, Michael, "Everyone Send Me $5", Tech Crinch Article and Comments, [Online]. Retrieved from the Internet: <URL: http://www.techcrunch.com/2006/02/15/everyone-send-me-5>, (Feb. 15, 2006), 13 pgs.
Cheong, Yu Chye, "Payments in Mobile Commerce", Telecom Media Networks, Wireless Internet Centre, http://www.apc.capgemini.com/industry/telecom/attachments/Payments%20in%20Mobile%20Commerce.pdf, (2002), 1-25.
Choi, Hyungki, et al., "Design of secure mobile payment", ICU PowerPoint Presentation, (Apr. 3, 2002), 1-7.
Cricket Communications, "Get Customer Support—FAQ's", [Online]. Retrieved from the Internet: <URL: http://www.mycricket.com/Cust_svc_opt_feat.aspx> (Accessed Feb. 2, 2005), (Copyright 2005), 6 pgs.
Ding, Melissa Soo, "Reconsidering the Challenges of mPayments: A Roadmap to Plotting the Potential of the Future mCommerce Market", 16th Bled eCommerce Conference, eTransformation, Bled, Slovenia,(Jun. 9-11, 2003), 873-884.
Focarelli, D., et al., "Why Do Banks Merge?", Journal of Money, Credit, and Banking vol. 34, No. 4, (Nov. 2002), 1047-1066.
Godfrey, Mike, "Panama Bank Merge to Form Biggest Banking Group in Central America", Tax-news com, New York Tuesday, (May 2000), 5 pgs.
Kreyer, Nina, "Characteristics of Mobile Payment Procedures", Proceedings of the ISMIS 2002, 1-13.
Linder, J. C, et al., "Bank Mergers: Integration and Profitability", Journal of Finanical Services Research, (1992), 35-55.
Little, Arthur D, "Making M-Payments a Reality", Arthur D. Little Global M-Payment Report 2004, http://www.adlittle.de/downloads/artikel/MPayment_press%20release_English_Final.pdf, (2004), 1-5.
McKitterick, David, "State of the Art Review of Mobile Payment Technology", Trinity College Dublin—Computer Science Department, Technical Reports, (Jun. 13, 2003), 1-22.
Mobile Tech News, "Ringtones made available using packaging 'short codes'", [Online]. Retrieved from the Internet: <URL: http://www.mobiletechnews.com/info/2004/07/09/005946.html> (Observed Feb. 2, 2005), (Jul. 9, 2004), 27 pgs.

(56) References Cited

OTHER PUBLICATIONS

Ondrus, Jan, et al., "A Disruption Analysis in the Mobile Payment Market", 38th Annual Hawaii International Conference on System Sciences (HICSS'05), (Jan. 3-6, 2005), 1-10.

Ondrus, Jan, "Mobile Payments: A Tool Kit for a Better Understanding of the Market", License Thesis—University of Lausanne, (Jul. 2003), 1-38.

Panis, Stathis, et al., "Mobile Commerce Service Scenarios and Related Business Models", Proceedings of the 1st International Conference on Mobile Business, (Jul. 8-9, 2002), 10 pgs.

Peirce, Michael, "Multi-Party Electronic Payments for Mobile Communications", A thesis submitted for the degree of Doctor of Philosophy in Computer Science, University of Dublin, Trinity College, Department of Computer Science, (Oct. 31, 2000), 1-219.

PR Newswire, "U.S. Cellular Introduces Web Browser for Cell Phones", Copyright © 1996-2003 PR Newswire Association LLC., [Online]. Retrieved from the Internet: <URL: http://prnewsire.com/computer-electronics/20041116/CGTU07616112004-1.html>, (Accessed Feb. 4, 2005), 2 pgs.

Rodgers, Zachary, "SMS Short Codes come Alive on TV", [Online]. Retrieved from the Internet: <URL: http://web.archive.org/web/20030410191431/http://www.instantmessagingplanet.com/wireless/article.php/2118811> (Archived Apr. 10, 2003), (Mar. 19, 2003), 5 pgs.

Rodgers, Zachary, "U.S. Wirelss Carriers Debut Universal Short Codes", [Online]. Retrieved from the Internet: <URL: http://www.instantmessagingplanet.com/wireless/article.php/3098231> (Observed Feb. 2, 2005), (Oct. 23, 2003), 4 pgs.

Varshney, Upkar, "A Framework for the Emerging Mobile Commerce Applications", Proceedings of the 34th Hawaii International Conference on System Sciences—2001, 1-10.

Whois Source, "Common Short Code—CSC", [Online]. Retrieved from the Internet: <URL: http://www.whois.sc/common-short-code/> (Accessed Feb. 2, 2005), (Copyright 1998-2005), 2 pgs.

U.S. Appl. No. 13/535,189, filed Jun. 27, 2012, Payment Via Financial Service Provider Using Network-Based Device.

"U.S. Appl. No. 12/752,985, Final Office Action mailed Nov. 14, 2012", 12 pgs.

"U.S. Appl. No. 13/535,189, Final Office Action mailed Jan. 4, 2013", 15 pgs.

"U.S. Appl. No. 13/535,189, Response filed Nov. 19, 2012 to Non Final Office Action mailed Aug. 17, 2012", 11 pgs.

"Australian Application Serial No. 2009291867—Subsequent Examiners Report", 4 pgs.

"Australian Application Serial No. 2009291867, Response filed Oct. 22, 2012 to Examiner's Report mailed Apr. 13, 2012", 18 pgs.

"European Application Serial No. 09813539.5, Examination Notification Art. 94(3) mailed Jan. 8, 2013", 6 pgs.

"Korean Application Serial No. 2011-7008082, Notice of Final Rejection mailed Dec. 20, 2012", 10 pgs.

"Korean Application Serial No. 2011-7008082, Response filed Nov. 16, 2012 to Office Action mailed Sep. 18, 2012", with English translation of claims, 39 pgs.

"U.S. Appl. No. 12/752,985, Response filed Mar. 14, 2013 to Final Office Action mailed Nov. 14, 2012", 11 pgs.

"U.S. Appl. No. 13/535,189, Response filed Apr. 4, 2013 to Final Office Action mailed Jan. 4, 2013", 12 pgs.

"European Application Serial No. 09813539.5, Office Aciton mailed Dec. 13, 2011", 1 pg.

"European Application Serial No. 09813539.5, Office Action mailed Apr. 19, 2011", 2 pgs.

"European Application Serial No. 09813539.5, Response filed May 19, 2011 to Office Action mailed Apr. 19, 2011", 6 pgs.

"Canadian Application Serial No. 2,736,489, Office Action mailed Apr. 9, 2013", 4 pgs.

"European Application Serial No. 09813539.5, Response filed May 7, 2013 to Office Action mailed Jan. 8, 2013", 16 pgs.

"Japanese Application Serial No. 2011-526305, Office Action mailed Mar. 19, 2013", with English translation of claims, 8 pgs.

"Korean Application Serial No. 2011-7008082, Appeal Brief filed Apr. 24, 2013", 11 pgs.

"Australian Application Serial No. 2009291867, Response filed Jun. 25, 2013 to Subsequent Examiners Report mailed Nov. 6, 2012", 15 pgs.

"Australian Application Serial No. 2009291867, Subsequent Examiners Report mailed Jul. 11, 2013", 4 pgs.

\* cited by examiner

Actors: Sender, Receiver, Payment Facilitator

PAYMENT APPLICATION FRAMEWORK

RELATED APPLICATION

The present application is a continuation of U.S. patent application Ser. No. 12/207,383 filed on Sep. 9, 2008 and entitled "Payment Application Framework," which is incorporated herein by reference.

FIELD

The present application relates generally to the field of electronic payments and, in one specific example embodiment, a framework for payment application development.

BACKGROUND

Electronic payment systems have evolved over the last several years with the introduction of services by different payment providers or facilitators. These payment facilitators may use different proprietary programming interfaces to develop payment applications. Each application may be developed independently of one another. This approach can be problematic as new features and requirements may have to be implemented individually depending on the service. This approach may result in unnecessary duplicate efforts and may delay time to bring new payment applications/services to the market.

BRIEF DESCRIPTION OF THE DRAWINGS

Some embodiments are illustrated by way of example and not limitation in the figures of the accompanying drawings in which.

DETAILED DESCRIPTION

For some example embodiments, methods and systems for developing payment applications using a payment application framework are disclosed. The payment application framework may include metaphors and constraints. The metaphors may include actors and objects. The actors and objects are some of the components of the payment transactions. The constraints may include rules that may be followed to process the payment transactions.

In the following description, for purposes of explanation, numerous specific details are set forth in order to provide a thorough understanding of example embodiments. It will be evident, however, to one skilled in the art that the present invention may be practiced without these specific details.

In example embodiments, a computer system (e.g., a client machine, server machine etc) configured by an application may constitute a "module" that is configured and operates to perform certain operations as described herein. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

Overview

A payment application framework may allow development of payment applications using a set of standards. The payment applications may cover different payment scenarios including, for example, checkout, send money, request money, split payment, mass payment, recurring payments and remittances. The example scenarios may involve one or more sending or paying parties and one or more receiving parties. The payment transactions may be associated with the transfer of funds in one or more currencies. The payment transactions may be associated with the transfer of valuable items or merchandises. For example, the payment transactions may also be associated with points, mileages, rewards, or any tangible or intangible objects or services that are perceived as having some measureable values by the one or more sending parties and the one or more receiving parties.

A payment application framework may include metaphors and constraints. There may be flows and services used with or applied to the metaphors and the constraints. Using the payment application framework, the development of new payment applications may be simplified.

Platform Architecture

Figure 1A:
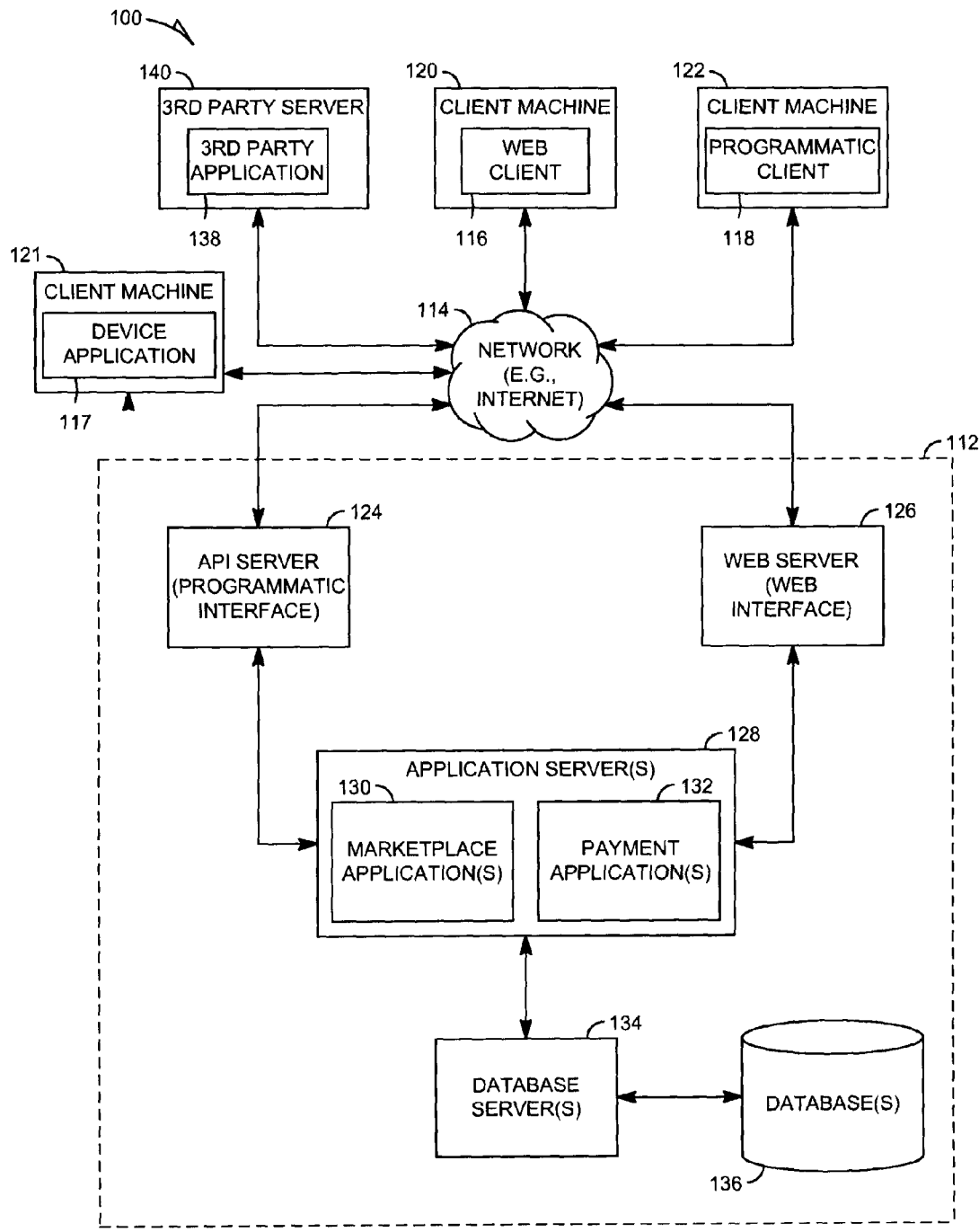
FIG. 1A illustrates a network diagram depicting a system, according to an example embodiment, having client-server architecture.

FIG. 1A illustrates a network diagram depicting a system 100 having client-server architecture, according to an example embodiment. A system, in the example form of a network-based system 112, provides server-side functionality, via a network 114 (e.g., the Internet, a public or private telephone, wired or wireless network, a private wireless network using technologies such as Bluetooth or IEEE 802.11x or other networks) to one or more clients. FIG. 1A illustrates, for example, a web client 116 (e.g., a browser, such as the INTERNET EXPLORER® browser developed by MICROSOFT®) executing on client machine 120. A device application 117 may execute on a client machine 121. A programmatic client 118 may execute on client machine 122. Each of the client machines 120-122 may be referred to as a network-based machine. Further, while the system 100 shown in FIG. 1A employs client-server architecture, embodiments are of course not limited to such an architecture, and could equally well find applications in a distributed, or peer-to-peer, architecture system.

The client machines 120-122, may include a mobile device, a palmtop computer, a laptop computer, a desktop computer, a personal digital assistant, a cellular telephone, a communications device, a wireless telephone, a land-line telephone, a control system, a camera, a scanner, a television, television cable, a telephone with a web browser, a facsimile machine, a printer, a pager, and/or a personal trusted device. The client machines 120-122 may include a card, such as a smart card, a magnetic card, and/or a key card. The client machines 120-122 may include a telephone or any device capable of Short Messaging Service (SMS) messaging, multimedia messaging service (MMS) messaging and/or generating audio tones, such as dual-tone multi-frequency (DTMF) tones.

The client machines 120-122 may be browser-enabled. The client machines 120-122 may engage in an interactive message and/or open communication session, such as SMS, electronic mail, Extensible Hypertext Markup Language (xHTML), Wireless Application Protocol (WAP), web, interactive voice response (IVR) and/or other mobile interfaces. The communication session between the client machines 120-122 and the network-based system 112 may involve multiple technology modalities. For example, a user of the client machines 120, 121 or 122 may engage the network-based system 112 via SMS and receive a responsive communication as an SMS with an embedded hyperlinked URL directing the client machines 120, 121, or 122 to a WAP or web page. A hyperlinked URL may be delivered directly to the client machines 120-122 from the application server(s) 128 and may be used to access a web site or a micro-browser, such as a WAP site. The client machines 120-122 may enable mobile videophone communications, digital television signals, and/or digital radio signals. The client machines 120-122 may include a receiver to receive near field communications.

Turning specifically to the network-based system 112, an Application Program Interface (API) server 124, and a web server 126 may be coupled to, and may provide programmatic interface and web interface to one or more application servers 128. The client machines 120-122 may use one or more of these interfaces to access the application server(s) 128.

For example, the web client 116 may access the application server(s) 128 via a web interface supported by the web server 126. The web interface may include a web browser or any micro-browser, such as xHTML or WAP. Similarly, the programmatic client 118 may access the various services and functions provided by the application server(s) 128 via the programmatic interface provided by the API server 124 and/or via the web interface provided by the web server 126. For an additional embodiment, an application supported by one or more applications of the application server(s) 128 may be downloadable to the client machines 120-122.

The client machines 120-122 may host the interface associated with the one or more applications of the application server(s) 128. The interface on the client machines 120-122 may be an API interface, an SMS interface, a web interface, and/or an IVR interface. Consumer wireless device platforms, such as Java 2 Platform Micro Edition (J2ME), J2SE and J2EE allow developers to use Java and a wireless toolkit to create applications and programs for the client machines 120-122. The J2ME interface may include an API for the client machines 120-122. The application of the programmatic client 118 may also access the network 114 using, for example, Binary Runtime Environment for Wireless (BREW).

The device application 117 executed on the client machine 121 may access the application server(s) 128 via the web interface of the web server 126. The device application 117 may be selected on the client machine 121 and launched in a background. The device application 117 may additionally or alternatively access the server(s) 128 via the programmatic interface of the API server 124. In an embodiment, the downloaded application described herein may include the device application 117.

The application server(s) 128 may host one or more administration module(s) 130 and one or more payment module(s) 132. The application server(s) 128 are, in turn, shown to be coupled to one or more database servers 134 that facilitate access to one or more databases 136. The account administration module(s) 130 may provide for administration of various accounts, as discussed in more detail herein.

A third party application 138 executing on a third party server 140 may offer goods and services to users of the client machines 120-122. The third party application 138 may have programmatic access to the network-based system 112 via the programmatic interface provided by the API server 124. The third party application 138 may be associated with a vendor, a merchant, or any organizations that may conduct transactions with the users of the client machines 120-122. For some example embodiments, the third party application 138 may be associated with an online marketplace (e.g., eBay, Inc. of San Jose, Calif.).

The payment module(s) 132 may provide a number of payment services and functions to the users of the client machines 120-122. The payment module(s) 132 may allow the users to accumulate value (e.g., in a commercial currency, such as the U.S. dollar, or a proprietary currency, such as "points") in accounts, and then later to redeem the accumulated value via several possible avenues. The payment module(s) 132 may also extend credit to a user and/or may also have access to other funding sources to complete transactions. Examples of the funding sources include a credit card, a bank account, and/or a credit line. The payment module(s) 132 may operate as a money transmitter.

A third party associated with the third party application 138 may conduct transactions with a user and may receive information from the payment module(s) 132. The information may include information regarding an order for a product, a service, a gift, a donation, etc. The information may also include shipment address specified by the user and payment status including payment confirmation. The payment module(s) 132 may secure financial information of the user with respect to the third party.

The client machine 120, 121, or 122 may host the interface associated with the payment module(s) 132 of the application server(s) 128. The web client 116, the device application 117, and/or the programmatic client 118 may be associated with the account management module(s) 130 and/or the payment module(s) 132.

The payment module(s) 132 may also be implemented as a standalone software program, which does not necessarily have networking capabilities. For this embodiment, the client machines 120-122 may be directly connected to the payment module(s) 132, without using the network 114.

The payment module(s) 132 may have access to the database 136 which may be coupled to database server(s) 134. The database 136 may include user account information. The user account information may include payment information, credit card information, checking account information, address information, etc.

The web client 116, the device application 117, and/or the programmatic client 118 may operate a program supported by the one or more database server(s) 134. The database server(s) 134 may support one or more account information links on a user interface of the client machines 120-122, for example, using the web client 116. By accessing the database server(s) 134, the user may add, amend or delete own account information including, for example, shipment address, payment method, etc.

The network 114 may include a mobile telephone network, a wireless wide area network (WWAN), a wired telephone network, a wireless local area network (wireless LAN or WLAN), a wireless Metropolitan Area Network (MAN), and/or a wireless personal area network (PAN) (e.g., a Bluetooth® network). Other network-based technologies that may be used to connect include PON, VSAT satellite, Micro-impulse Radar, Radio Frequency identification (RFID), Ultra-Wide Band, and/or Infrared. The client machines 120-122 may connect to the web using mobile internet exchange protocol such as, for example, Wireless Application Protocol (WAP) and/or Hypertext Transport Protocol (HTTP).

Marketplace Applications

Figure 1B:
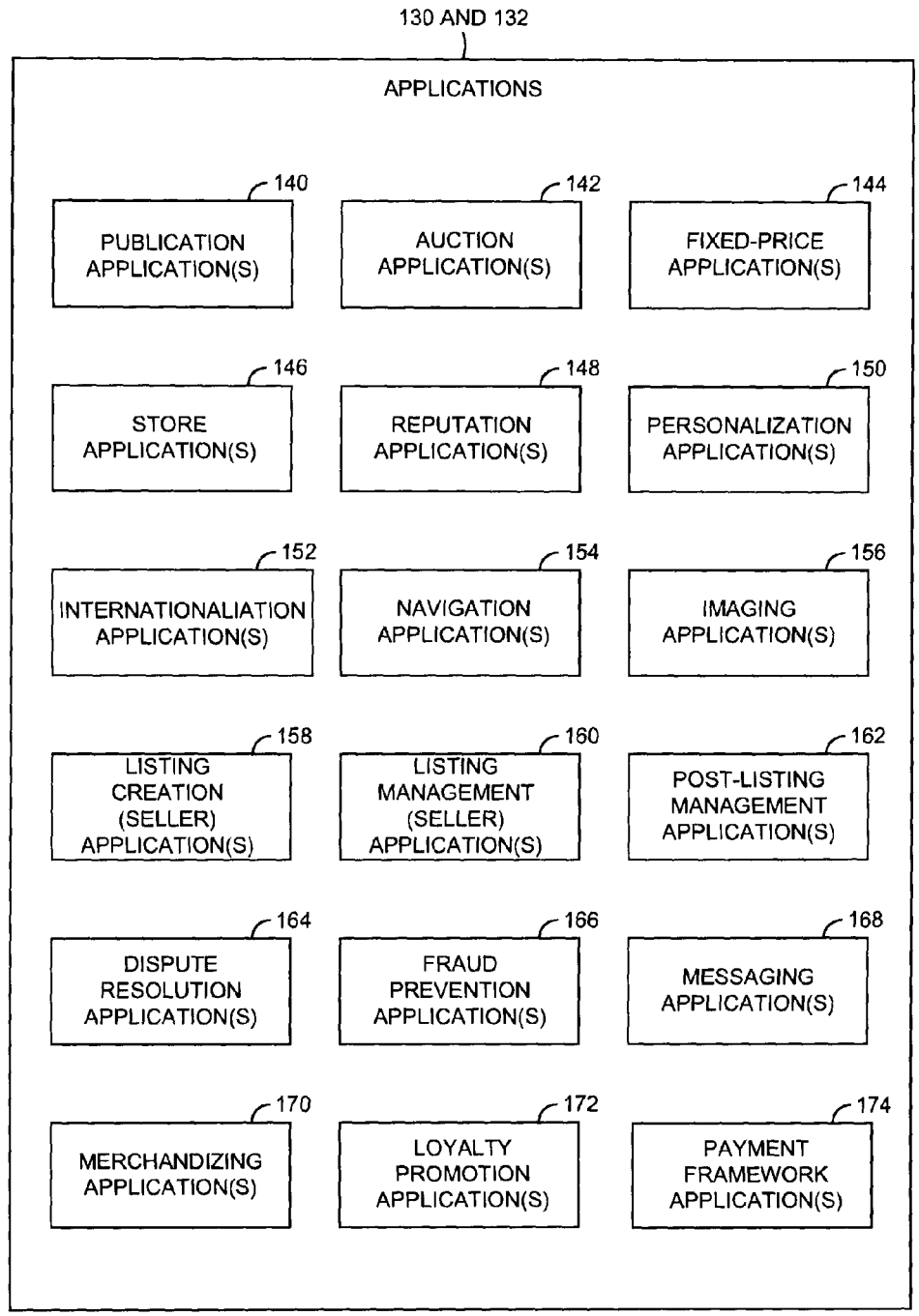
FIG. 1B is a block diagram illustrating example applications that may associated with the system of FIG. 1A, in accordance with some example embodiments.

FIG. 1B is a block diagram illustrating multiple applications 130 and 132 that, in one example embodiment, are provided as part of the networked system 112. The applications 130 and 132 may be hosted on dedicated or shared server machines (not shown) that are communicatively coupled to enable communications between server machines. The applications 130 and 132 themselves are communicatively coupled (e.g., via appropriate interfaces) to each other and to various data sources, so as to allow information to be passed between the applications or so as to allow the applications 130 and 132 to share and access common data. The applications 130 and 132 may furthermore access one or more databases 136 via the database servers 134.

The networked system 112 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 130 are shown to include at least one publication application 140 and one or more auction applications 142 which support auction-format listing and price setting mechanisms (e.g., English, Dutch, Vickrey, Chinese, Double, Reverse auctions etc.). The various auction applications 142 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 144 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 146 allow a seller to group listings within a "virtual" store, which may be branded and otherwise personalized by and for the seller. Such a virtual store may also offer promotions, incentives and features that are specific and personalized to a relevant seller.

Reputation applications 148 allow users that transact, utilizing the networked system 112, to establish, build and maintain reputations, which may be made available and published to potential trading partners. Consider that where, for example, the networked system 112 supports person-to-person trading, users may otherwise have no history or other reference information whereby the trustworthiness and credibility of potential trading partners may be assessed. The reputation applications 148 allow a user, for example through feedback provided by other transaction partners, to establish a reputation within the networked system 112 over time. Other potential trading partners may then reference such a reputation for the purposes of assessing credibility and trustworthiness.

Personalization applications 150 allow users of the networked system 112 to personalize various aspects of their interactions with the networked system 112. For example a user may, utilizing an appropriate personalization application 150, create a personalized reference page at which information regarding transactions to which the user is (or has been) a party may be viewed. Further, a personalization application 810 may enable a user to personalize listings and other aspects of their interactions with the networked system 112 and other parties.

The networked system 112 may support a number of marketplaces that are customized, for example, for specific geographic regions. A version of the networked system 112 may be customized for the United Kingdom, whereas another version of the networked system 112 may be customized for the United States. Each of these versions may operate as an independent marketplace, or may be customized (or internationalized) presentations of a common underlying marketplace. The networked system 112 may accordingly include a number of internationalization applications 152 that customize information (and/or the presentation of information) by the networked system 112 according to predetermined criteria (e.g., geographic, demographic or marketplace criteria). For example, the internationalization applications 152 may be used to support the customization of information for a number of regional websites that are operated by the networked system 112 and that are accessible via respective web servers 126.

Navigation of the networked system 112 may be facilitated by one or more navigation applications 154. For example, a search application (as an example of a navigation application) may enable key word searches of listings published via the networked system 112. A browse application may allow users to browse various category, catalogue, or inventory data structures according to which listings may be classified within the networked system 112. Various other navigation applications may be provided to supplement the search and browsing applications.

In order to make listings, available via the networked system 112, as visually informing and attractive as possible, the marketplace applications 130 may include one or more imaging applications 156 utilizing which users may upload images for inclusion within listings. An imaging application 156 also operates to incorporate images within viewed listings. The imaging applications 156 may also support one or more promotional features, such as image galleries that are presented to potential buyers. For example, sellers may pay an additional fee to have an image included within a gallery of images for promoted items.

Listing creation applications 158 allow sellers conveniently to author listings pertaining to goods or services that they wish to transact via the networked system 112, and listing management applications 160 allow sellers to manage such listings. Specifically, where a particular seller has authored and/or published a large number of listings, the management of such listings may present a challenge. The listing management applications 160 provide a number of features (e.g., auto-relisting, inventory level monitors, etc.) to assist the seller in managing such listings. One or more post-listing management applications 162 also assist sellers with a number of activities that typically occur post-listing. For example, upon completion of an auction facilitated by one or more auction applications 142, a seller may wish to leave feedback regarding a particular buyer. To this end, a post-listing management application 162 may provide an interface to one or more reputation applications 148, so as to allow the seller conveniently to provide feedback regarding multiple buyers to the reputation applications 148.

Dispute resolution applications 824 provide mechanisms whereby disputes arising between transacting parties may be resolved. For example, the dispute resolution applications 164 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 166 implement fraud detection and prevention mechanisms to reduce the occurrence of fraud within the networked system 112.

Messaging applications 168 are responsible for the generation and delivery of messages to users of the networked system 112, such messages for example advising users regarding the status of listings at the networked system 112 (e.g., providing "outbid" notices to bidders during an auction process or to provide promotional and merchandising information to users). Respective messaging applications 168 may utilize any number of message delivery networks and platforms to deliver messages to users. For example, messaging applications 168 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 170 support various merchandising functions that are made available to sellers to enable sellers to increase sales via the networked system 112. The merchandising applications 170 also operate the various merchandising features that may be invoked by sellers, and may monitor and track the success of merchandising strategies employed by sellers.

The networked system 112 itself, or one or more parties that transact via the networked system 112, may operate loyalty programs that are supported by one or more loyalty/promotions applications 172. For example, a buyer may earn loyalty or promotions points for each transaction established and/or concluded with a particular seller, and be offered a reward for which accumulated loyalty points can be redeemed.

Payment framework applications 174 are responsible for the interaction with a payment application developer to enable developing payment applications. The payment framework applications 175 may perform operations that enable associating components of payment transactions with at least some sets of predefined tools including those associated with a sending entity (or sender), a receiving entity (or receiver), a payment system (or a payment facilitator) along with flows that enable transfer of values from the sender to the receiver. The payment framework applications 174 may be able to access information stored in the databases 136.

Data Structures

Figure 1C:
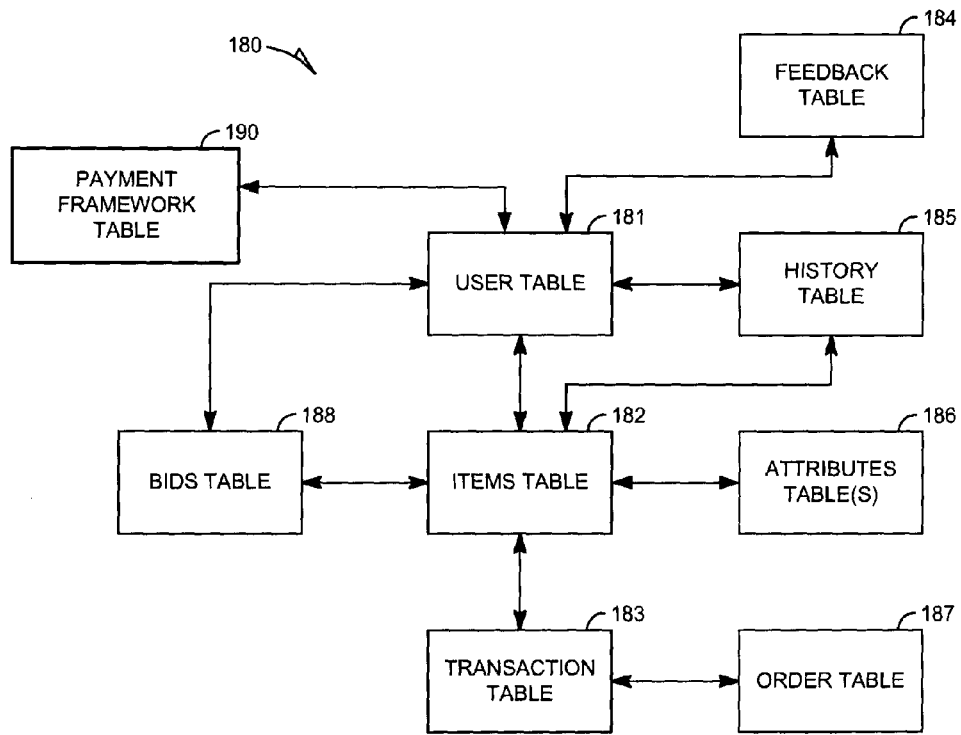
FIGS. 1C-1D illustrate example tables that may be associated with a database included in the system of FIG. 1A, in accordance with some example embodiments.

FIG. 1C is a high-level entity-relationship diagram, illustrating various tables 180 that may be maintained within the databases 136, and that are utilized by and support the applications 130 and 132. A user table 181 contains a record for each registered user of the networked system 112, and may include identifier, address and financial instrument information pertaining to each such registered user. A user may operate as a seller, a buyer, or both, within the networked system 112. In one example embodiment, a buyer may be a user that has accumulated value (e.g., commercial or proprietary currency), and is accordingly able to exchange the accumulated value for items that are offered for sale by the networked system 112.

The user table 181 may be associated with one or more of the sender and the receiver that may be used by the payment framework applications 175 described in FIG. 1B.

The tables 180 also include an items table 182 in which are maintained item records for goods and services that are available to be, or have been, transacted via the networked system 112. Each item record within the items table 182 may furthermore be linked to one or more user records within the user table 181, so as to associate a seller and one or more actual or potential buyers with each item record.

A transaction table 183 contains a record for each transaction (e.g., a purchase or sale transaction) pertaining to items for which records exist within the items table 182.

An order table 187 is populated with order records, each order record being associated with an order. Each order, in turn, may be with respect to one or more transactions for which records exist within the transaction table 183.

Bid records within a bids table 188 each relate to a bid received at the networked system 112 in connection with an auction-format listing supported by an auction application 142. A feedback table 184 is utilized by one or more reputation applications 148, in one example embodiment, to construct and maintain reputation information concerning users. A history table 185 maintains a history of transactions to which a user has been a party. One or more attributes tables 186 record attribute information pertaining to items for which records exist within the items table 182. Considering only a single example of such an attribute, the attributes tables 916 may indicate a currency attribute associated with a particular item, the currency attribute identifying the currency of a price for the relevant item as specified in by a seller. Payment framework table 190 may include information that may be used by the payment framework applications 174.

Figure 1D:
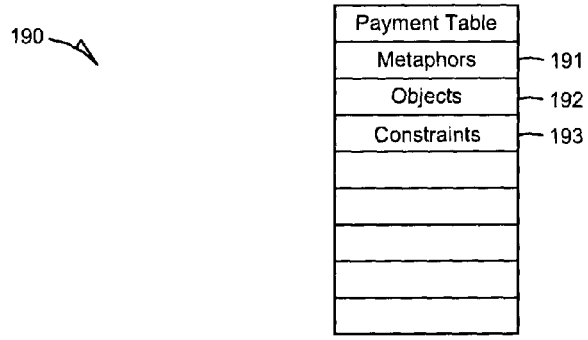

FIG. 1D provides further details regarding a payment framework table that is shown in FIG. 1C to be maintained within the databases 136. As illustrated, the payment framework table 190 may include multiple fields. Each of the fields may be associated with some user information such as, for example, metaphors 191, objects 192, and constraints 193, as described in more details below.

Payment Application Framework

For some example embodiments, payment applications that are developed using the payment application framework generally enable transfer of values (e.g., funds, reward points, etc.) from an account associated with one party (referred to as a sender) to another account associated with another party (referred to as a receiver). To perform the value transfer, execution of the payment applications may be based on one or more approval flows. This may require having access or the rights to initiate these approval flows and to use the services of a payment facilitator. One example of a payment facilitator is the services offered by PayPal, Inc. of San Jose, Calif. Having access may not include having approval to transfer the values out of the sender's account. Having approval may implicitly include having access. This may be applicable in pre-approval situations, as described below.

The payment applications may generate pay requests. The pay requests are related to the payment transactions. The pay requests include instructions provided to the payment facilitator (or payment processing logic in the payment facilitator) to set up or define one or more payment transactions. For example, in a split payment scenario, a single pay request can refer to a single payment transaction or multiple payment transactions. The pay requests may be viewed as tools used by the developers to set up the payment transactions. The pay requests may be transparent to the senders and the receivers. The payment transactions may be more visible and recognizable to the senders and the receivers.

Figure 2:
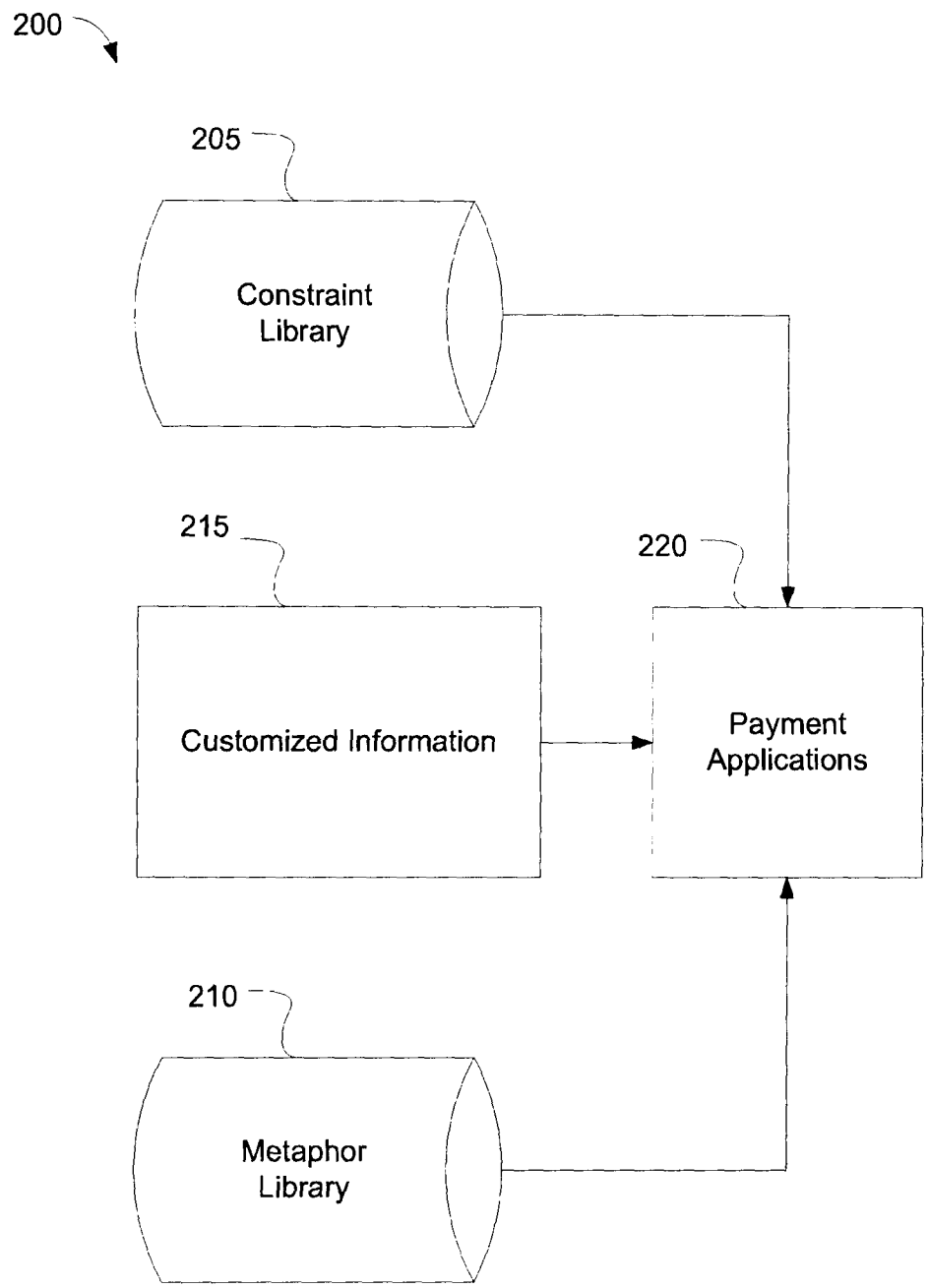
FIG. 2 is a block diagram illustrating a high level view of a payment application framework, in accordance with some example embodiments.

FIG. 2 is a block diagram illustrating a high level view of a payment application framework, in accordance with some example embodiments. Payment application framework 200 may be used to develop payment applications 220 which may form one or more payment module(s) 132 described in the system 100. The payment application framework 200 may include a constraint library 205 and a metaphor library 210. The payment application framework 200 may also enable the payment applications 220 to receive customized information 215. The customized information 215 may include information that modifies, replaces, or complements the information included in the constraint library 205 and/or the metaphor library 210.

For some example embodiments, the metaphor library 210 may include metaphors that represent high level views of more detailed payment-related concepts. The metaphors may be designed to be simple and easy to understand and to enable consistency across different types of payment applications 220. For some example embodiments, the constraint library 205 may include constraints that are associated with the payment rules. Some constraints may be associated with default values. Some examples of the constraints include frequency of payment, currency associated with payments, etc.

For some example embodiments, the metaphors in a payment application framework may include actors, objects, and phases. The actors, objects and phases may interact with one another in similar fashions across multiple payment applications developed using the payment application framework 200. The payment applications may be developed to process different types of payment transactions.

Metaphors: Actors

Figure 3A:
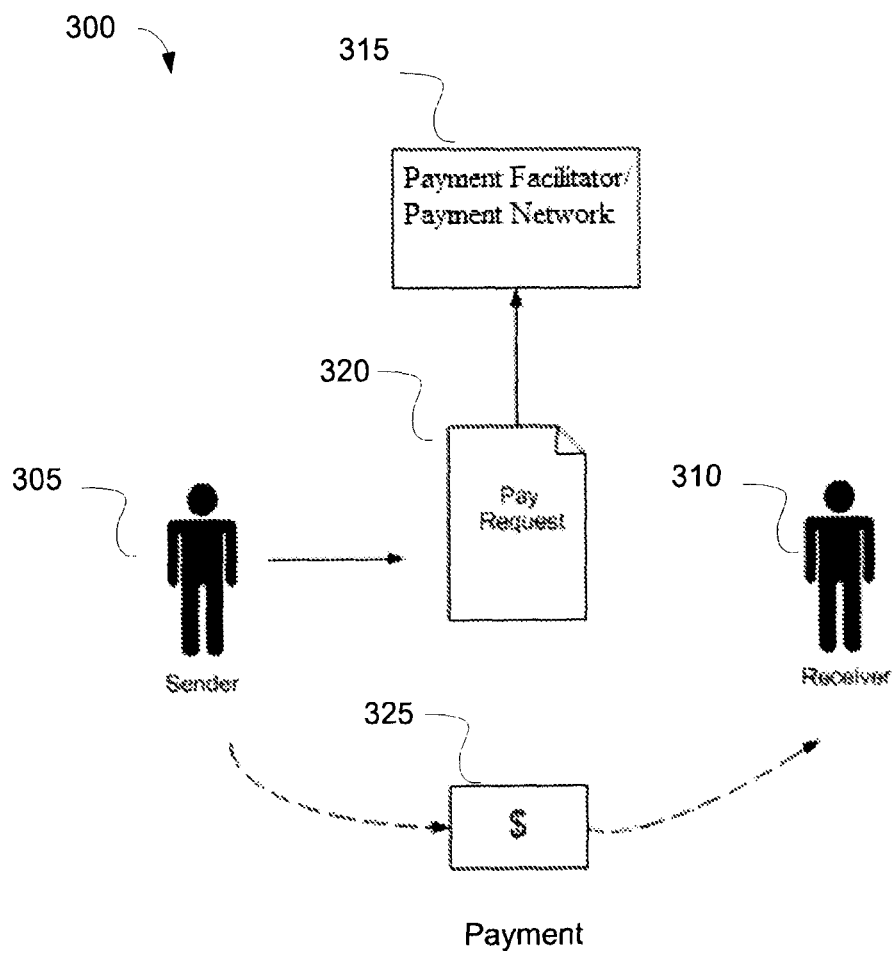
FIG. 3A is a diagram illustrating an application of the metaphors in a payment scenario, in accordance with some example embodiments.

FIG. 3A is a diagram illustrating an application of the metaphors in a payment scenario, in accordance with some example embodiments. In this example, diagram 300 includes sender 305, receiver 310, and payment facilitator (or payment network) 315. The sender 305, the receiver 310, and the payment facilitator 315 are considered to be actors that participate in payment transactions within the payment application framework 200.

A/ Sender

For some example embodiments, the sender 305 is an account holder of an account with the payment facilitator 315. Payments are to be debited from an account of the sender 305. The sender 305 may represent any person, persons or entity who actually owns the account. The sender 305 may also represent any person, persons, entity, or entities who have received approval to access the account of behalf of the actual owner. The sender 305 may be associated with one or more payment transactions. For some example embodiments, the sender 305 may be associated with an email address related to the payment facilitator 315. For example, the payment facilitator 315 may be PayPal, Inc. of San Jose, Calif., and an email address related to PayPal, Inc. may be SenderID@PayPal.com. For some embodiments, an email address may be substituted with a mobile phone number or other such independent references to an account. For some example embodiments, there may be multiple senders 305 sending payments to a single receiver 310 in a payment transaction. This payment scenario is referred to as aggregate payments.

B/ Receiver

For some example embodiments, the receiver 310 is an account holder of an account with the payment facilitator 315. The receiver 310 may represent any person, persons or entity who actually owns the account. The receiver 310 may also represent any person, persons, entity, or entities who have received approval to access the account of behalf of the actual owner. The receiver 310 may be associated with one or more payment transactions. For some example embodiments, the receiver 310 may be associated with an email address related to the payment facilitator 315. For some example embodiments, there may be multiple receivers 310 receiving payments from a single sender 305. This payment scenario is referred to as split payments. For some example embodiments, there may be multiple senders 305 and multiple receivers 310 in a payment transaction.

C/ Payment Facilitator

For some example embodiments, the payment facilitator 315 may receive pay request 320 from the sender 305. The pay request 320 may have one or more line items describing the pay request in detail. The payment facilitator 315 may process the pay request 320 and may cause payment 325 to be sent from an account of the sender 305 to an account of the receiver 310. The payment facilitator 315 may enable the sender 305 to use different payment instruments. For example, the payment instruments may include credit cards, debit cards, checking accounts, savings accounts, etc.

Figure 3B:
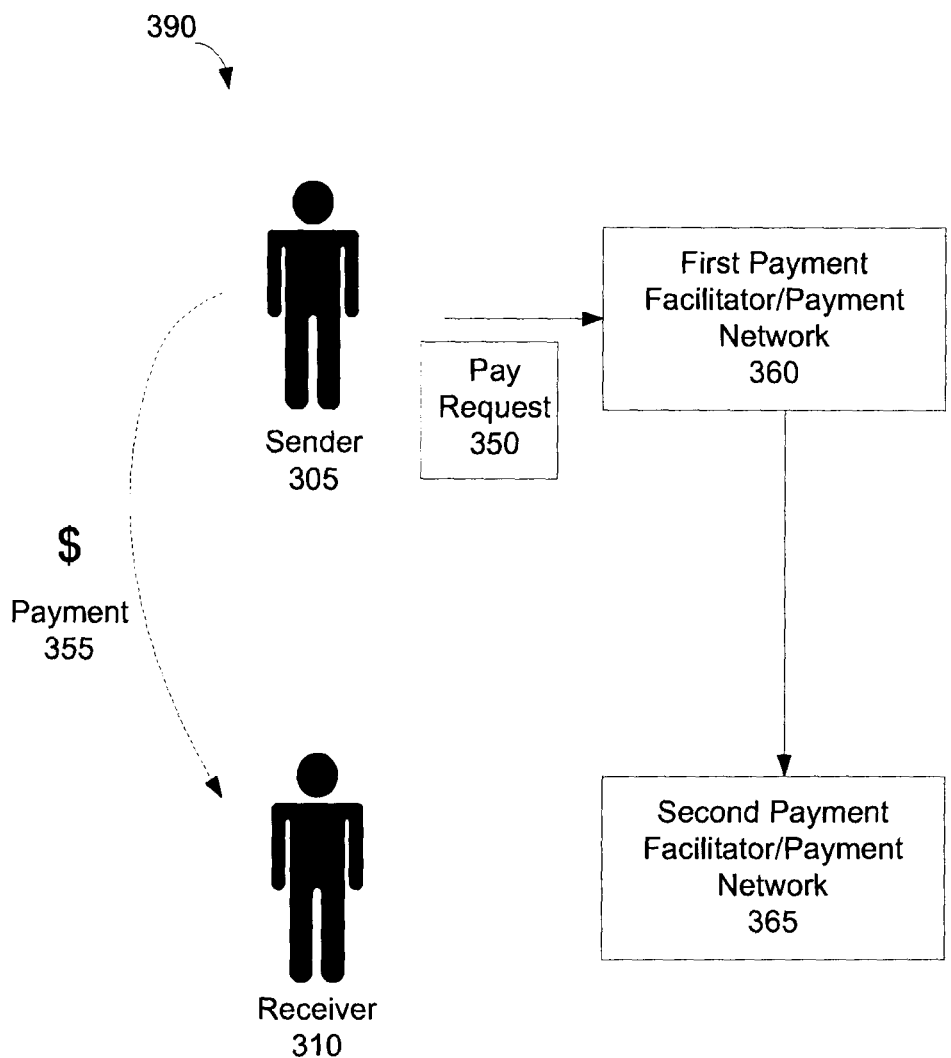
FIG. 3B is a diagram illustrating another application of the metaphors in a payment scenario, in accordance with some example embodiments.

FIG. 3B is a diagram illustrating another application of the metaphors in a payment scenario, in accordance with some example embodiments. The payment scenario described in this example may also be referred to as payment extension. Diagram 390 includes sender 305, receiver 310, pay request 350, and payment 355. For some example embodiments, the payment application framework 200 may enable the payment 355 to be sent from a first payment facilitator or payment network 360 to a second payment facilitator or a payment network 365. The payment facilitator 360 and the payment facilitator 365 may be the same payment facilitator, or they may be different payment facilitators. Similarly the "from" payment network and the "to" payment network may be the same payment network, or they may be different payment networks. Some example of the payment networks may include Automated Clearing House (ACH), Debit, Swift and virtual currencies. In this example, the payment networks may also be considered as an actor that participates in the payment transactions within the payment application framework 200.

Although the following discussions use examples that refer to payments processed by a payment facilitator, it should be noted that the discussions may also apply to one or more payment facilitator(s) and/or one or more payment network(s).

Metaphors: Objects

For some example embodiments, the objects may include pay requests, pay keys, and parameters associated with the pay requests and the pay keys. The pay requests may include information that defines a payment. The pay keys may be encrypted and may be used to request for approval or to indicate approval. As will be described, the approvals may be associated approval flows or pre-approval flows. The parameters may be included in hypertext transfer protocol (HTTP) messages. The HTTP messages may be sent between the payment applications and may be processed by the payment facilitator.

Referring to the example illustrated in FIG. 3A, the pay request 320 may include an amount, information about a sender, information about a receiver, and a currency. The pay request 320 may also include other related information such as, for example, transaction fee. The transaction fee is the fee charged by the payment facilitator 315 to process the payment transaction. The transaction fee may be paid by the sender 305 or the receiver 310.

The pay request 320 is sent to and processed by the payment facilitator 315. The payment facilitator 315 may issue a pay key in response to receiving the pay request 320. The payment facilitator 315 may send the pay key to the sender 305. The pay key may be used for approval. For some example embodiments, the pay request 320 is not processed until the sender 305 approves the pay request 320. The sender 305 may provide an approval (or an indication of approval) based on an approval flow. It may be noted that the indication of approval received from the sender 305 may either be a positive approval or a negative approval.

A pay key is uniquely associated with a pay request and may be used in subsequent payment transactions that are related to the pay request. For some example embodiments, a pay request waiting for an approval from the sender 305 may expire if the approval is not received after a predetermined period of time. An extension may be issued to prevent the pay request from expiring. An example of the pay key is illustrated as pay key 420 in FIG. 4A.

For some example embodiments, an approval may be provided by the sender 305 before a payment is made. This is referred to as pre-approval. In pre-approval situations, a pre-approval request may be created and sent to the payment facilitator. The payment facilitator may process the pre-approval request and may return a pre-approval key. Subsequently, a pay request along with the pre-approval pay may be sent to the payment facilitator for processing.

For some example embodiments, the pre-approval key may be issued for one time future payment or for a set of recurring future payments. A pre-approval key may be unique to a pre-approval request. The sender 305 may provide a pre-approval based on a pre-approval flow. The pre-approval flow may include a set of rules. For some example embodiments, a pre-approval request may expire after a predetermined period of time unless it is extended. An example of the pre-approval key is illustrated as pre-approval key 465 in FIG. 4B.

The payment facilitator may perform functions to handle the approval requests and the pre-approval requests. The payment facilitator may also perform functions to handle other payment-related requests. Some of these functions may be required in every payment transaction, while some may be optional. Without limiting the services and/or capabilities of the payment facilitator, the following table (Table 1) highlights some example functions.

TABLE 1

| Service or Capability Name - Usage |
| --- |
| Pay - used in individual payment transaction. |
| GetPayStatus - used to determine the status of a payment. |
| GetPreApproval - used to get approval for a future one-time or recurring payment. |
| GetPreApprovalStatus - used to determine if a sender has approved a -pre-approval request. |
| Capture - used to capture funds that have been reserved for a payment. Partial payments may not be allowed, but within split payments the capture of a particular segment or transaction of the pay request is possible. |
| Refund - used in complex split payment scenarios where refunds from multiple receivers are to be triggered all at once the refund function is used. This function may require third party access right. A refund transaction can be executed by the receiver by calling the Refund function. The receiver would pass in a Pay Key and the passed in refund amount to be refunded to the sender. |
| Interactive Voice Response (IVR) Approval - used to trigger payment facilitator's IVR service to call a registered payment facilitator user's mobile phone number to get approval for a payment. |
| GetPayRequestDetails - used to get information about a pay request based on a pay key. A pay key may be mapped to to one or more transaction. |
| GetPreApprovalRequestDetails - used to get information about a pay request based on a pre-approval key. |

Metaphor: Phases

Figure 4A:
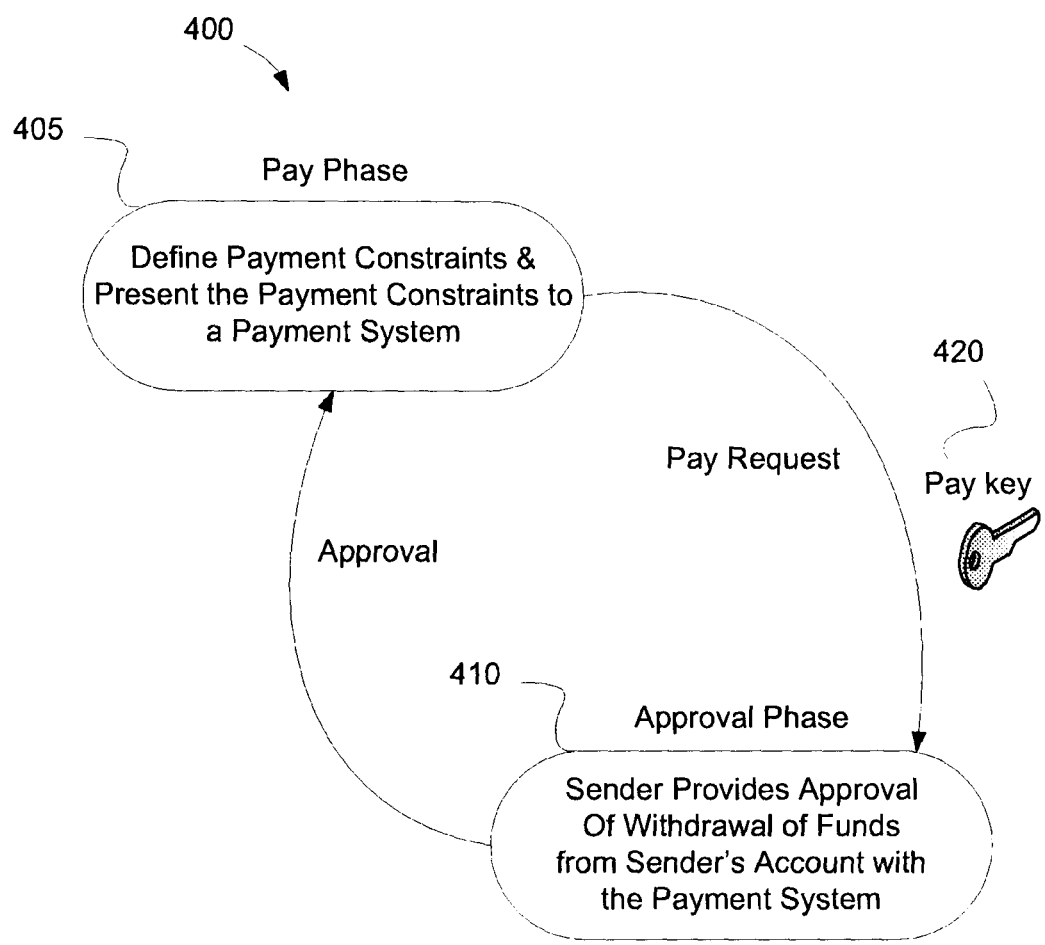
FIG. 4A is a diagram that illustrates phases that are included in the metaphors, in accordance with some example embodiments.

FIG. 4A is a diagram that illustrates phases that are included in the metaphors, in accordance with some example embodiments. Diagram 400 illustrates phases that may be part of the metaphors of the payment application framework. There may be two phases. One phase is referred to as a pay phase 405, the other is referred to as an approval phase 410. During the pay phase 405, constraints may be defined and presented to the payment facilitator 315. During the approval phase 410, an approval may be provided by the sender 305 approving the withdrawal of funds from a sender's account with the payment facilitator 315. As will be described in FIG. 4B, a variation of the approval phase 410 is a pre-approval phase 455.

For some example embodiments, the pay phase 405 may occur before the approval phase 410. An example is a simple checkout scenario where a pay request is followed by an approval by the sender 305. As illustrated, the pay request may include a pay key 420 as a parameter. Operations associated with the approval phase 410 may be based on an approval flow. The approval flow may direct the sender 305 to a web site of the payment facilitator 315. The web site of the payment facilitator 315 may provide an interface for the sender 305 to provide information necessary for an approval. For example, the sender 305 may be a customer purchasing an item at a merchant's web site. The sender 305 may be redirected from the merchant's web site to the web site of the payment facilitator. This redirection may be via a Uniform Resource Locator (URL) link associated with an interface presented by the web site of the payment facilitator (e.g., PayPal web site). Based on the sender 305 providing the approval for payment, the sender 305 may be redirected back to the merchant's web site. In this scenario, a redirect URL link (e.g., link to the merchant's web site) may be sent as a parameter, and the sender 305 is redirected to a specified page of the merchant's web site following completion of the approval flow.

For some example embodiments, the approval phase 410 may be associated with approval notification flows. An approval notification flow may use a notification URL link as a parameter. The notification URL link may be associated with a merchant. For example, when the sender 305 provides the approval, the merchant is notified so that the purchase transaction of the sender 305 at the merchant's web site can proceed to a next step. The merchant in this example is in the role of the receiver 310. For some example embodiments, the approval phase 410 may include sending a notification to the sender 305 when the funds are transferred out of the sender's account. This may be performed via email, wireless communication, or any other form of communication that may enable notifying the sender 305. A similar notification may also be sent to the receiver 310.

Figure 4B:
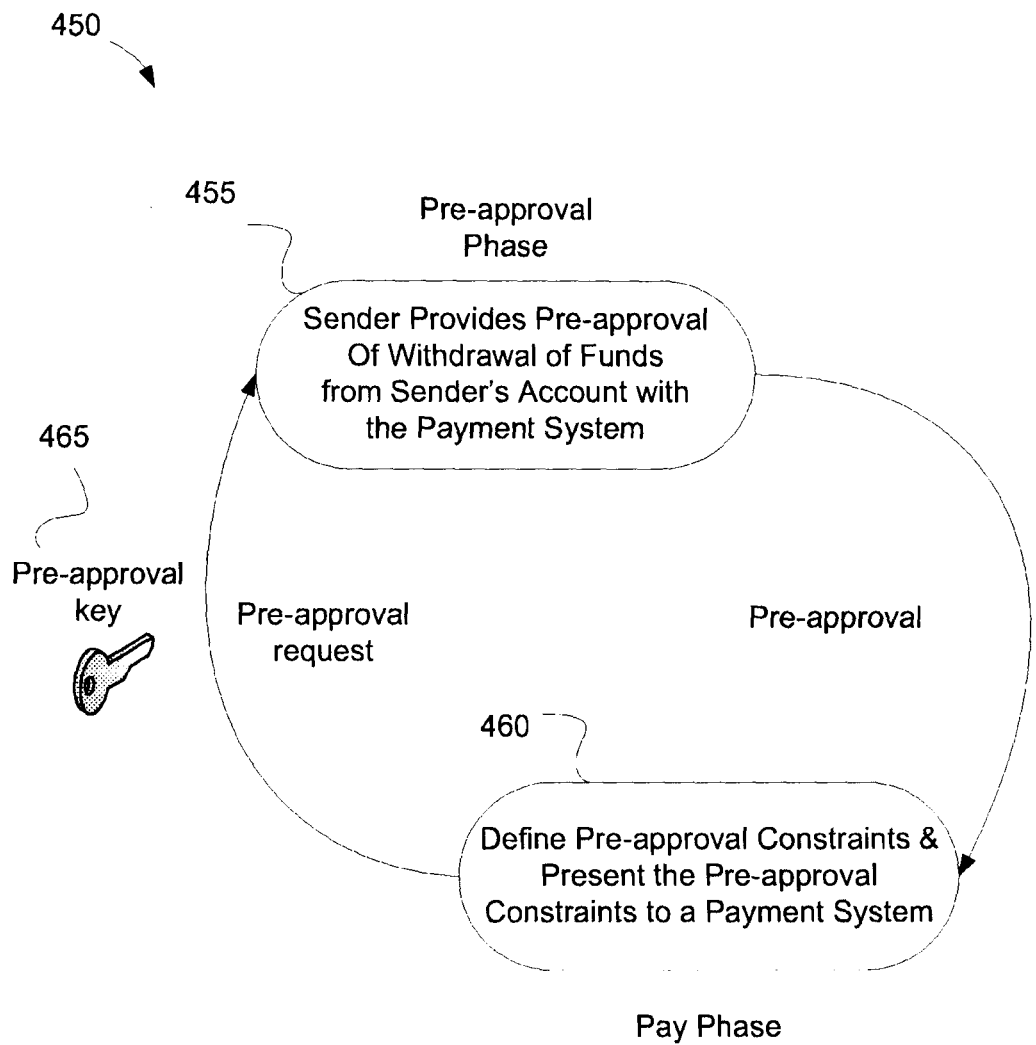
FIG. 4B is a diagram that illustrates an example of the phases where there is a pre-approval, in accordance with some example embodiments.

FIG. 4B is a diagram that illustrates an example of a pre-approval phase, in accordance with some example embodiments. Diagram 450 illustrates a pre-approval phase 455 and a pay phase 460. In a pre-approval scenario, the pre-approval phase 455 may occur before the pay phase 460. The pre-approval phase 455 may be based on a pre-approval flow.

A pre-approval request may be initiated and sent to the sender 305. The pre-approval request may be initiated by a receiver (e.g., a merchant) 310. A pre-approval key 465 may also be sent. The sender 305 may review the pre-approval request via a pre-approval interface associated with the payment facilitator 315. The sender 305 may provide the receiver 310 the pre-approval. As described above, the pre-approval key 465 may be unique and may be associated with the pre-approval request for one time or for recurring future payments. For some example embodiments, the pre-approval key 465 may be sent using encrypted data.

Constraints

The constraints may include rules that may be used by the developers to more efficiently develop payment applications. The rules may be implemented in the payment flows. The payment flows may be associated with the approval flows and/or the pre-approval flows. Parameters may be used with the payment flows. The parameters may have default values. For some example embodiments, some of the parameters may be used in the payment flows with their default values unchanged. The following table (Table 2) illustrates an example summary of the payment flows that may be used.

TABLE 2

| | Pay → Approval | Pre-Approval → Pay |
|---|---|---|
| Pre-Approval | | A pre-approval request is submitted to the payment processing logic of a payment facilitator. The pre-approval request is processed. A pre-approval key is returned. A sender is directed to the pre-approval flow with the pre-approval key as a parameter. |
| Payment | A pay request is submitted by a receiver to the payment processing logic of the payment facilitator. The pay request is processed and a pay key is returned to the requester (receiver). | A pay request is submitted along with the pre-approval key to the payment processing logic of the payment facilitator. The pay request is processed. The payment is processed. |
| Approval | A sender is directed to an approval flow with pay key as a parameter. The sender provides an approval, and the payment is processed. | |

In order for a receiver 310 to use the payment flows, the receiver 310 may need to have access to services provided by the payment facilitator 315. As described above, having access may enable the receiver 310 to send the pay requests 320 to the payment facilitator 315. In situations when the sender 305 provides a pre-approval for a payment, the sender 305 may implicitly provide the receiver 310 (the party who initiated the pre-approval request) access to the account of the sender 305 on behalf of the sender 305. This may be limited to a time duration when the pre-approval request is active. For some example embodiments, the receiver 310 may initiate a pay request only to reserve funds. In those situations, only operations associated with the reserve funds may be completed, and the transfer of funds may wait until there is a capture (described above). The capture may include the pay key as a parameter.

Constraints: Approval Flows

Figure 5:
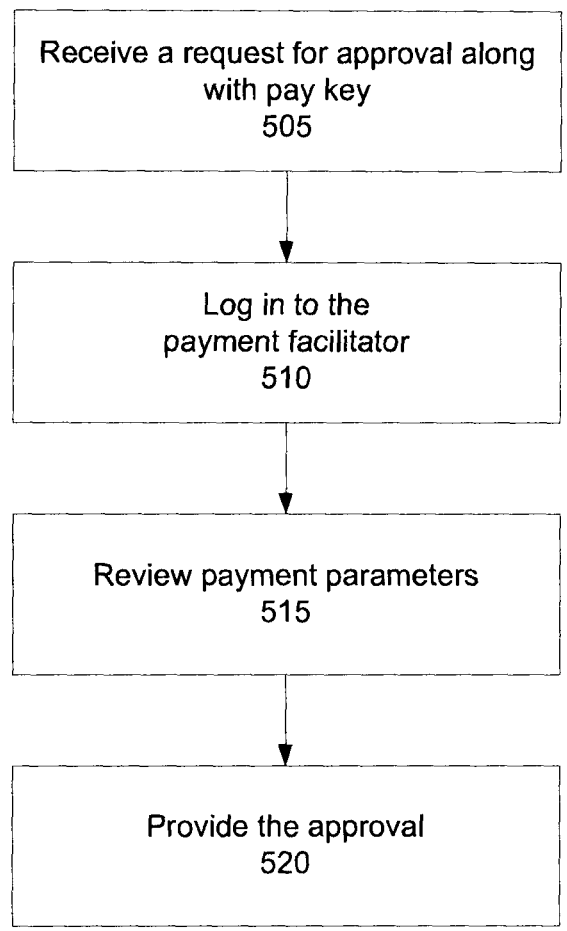
FIG. 5 is a flow diagram that illustrates an example of an approval flows, in accordance with some example embodiments.

FIG. 5 is a flow diagram that illustrates an example of an approval flow, in accordance with some example embodiments. An approval flow may include rules to send the pay request 320 and to get the sender 305 to provide an approval for the pay request 320. The process in diagram 500 may start at block 505.

At block 505, a pay request 320 is received by the sender 305. The pay request 320 is associated with a pay key 420. The pay key 420 may be encrypted for security. The pay key 420 may be sent to the sender 305 via a web page redirect, email, short message services (SMS) messages, etc. The pay key 420 may enable the sender 305 to retrieve the specific information about the pay request 320. For some example embodiments, the approval flow may be associated with an approval interface showing the specific details of the payment based on the pay request 320. The interface may be presented to the sender 305. For example, the sender 305 may be directed to a web page associated with the interface. The web page may be part of a web site associated with the payment facilitator 315. The sender 305 may need to log in. This is illustrated in block 510.

After the sender 305 logs in, the specific information about the pay request 320 may be displayed. At block 515, the sender 305 may review the pay request 320. At block 520, the sender 305 may provide an approval. Based on the sender 305 providing the approval, the process may be completed. The sender 305 may be directed back to a web page that causes the pay request 320 to be initiated.

Constraints: Interactive Voice Response (IVR) Approval Flows

Interactive Voice Response (IVR) is a technology that is used in mobile applications via application programming interfaces (APIs). The IVR approval flows may be used to get an approval from a sender 305 via a mobile phone of the sender 305. The sender 305 may need to have the sender's phone number verified by the payment facilitator 315. For some example embodiments, the payment facilitator 315 may include processing logic that places calls to the sender 305 using the sender's phone number that was previously registered with the payment facilitator 315. As illustrated in FIG. 5, the pay request 320 and the pay key 420 may be sent to the sender 305 for approval. However, instead of directing the sender 305 to a web page, the IVR system may call the sender 305 on the phone to get the approval. The sender 305 may use a personal identification number (PIN) and provide the approval via the sender's phone.

Constraints: Pre-Approval Flows

Figure 6:
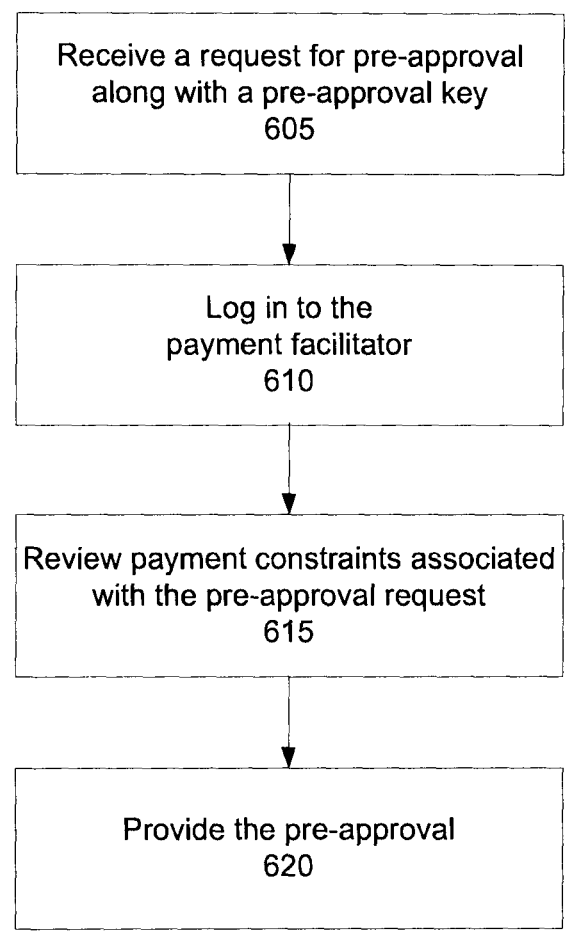
FIG. 6 is a flow diagram that illustrates an example of a pre-approval flow, in accordance with some example embodiments.

FIG. 6 is a flow diagram that illustrates an example of a pre-approval flow, in accordance with some example embodiments. A pre-approval flow may be used to approve the constraints offered in future one-time or recurring payments. The process in diagram 600 may start at block 605. At block 605, a pre-approval request is received by the sender 305. The pre-approval request may be received with a pre-approval key 465. The pre-approval key 465 may be encrypted for security.

The pre-approval key 465 may be sent to the sender 305 via a web page redirect, email, short message services (SMS) messages, etc.

For some example embodiments, the constraints included in the pre-approval request may need to be negotiated between the sender 305 and the receiver 310 separate from the pre-approval flow. For some example embodiments, the pre-approval flow may be associated with a pre-approval interface showing the specific details of the pre-approval request. The pre-approval interface may be associated with the payment facilitator 315 and may be presented to the sender 305. For example, this may be performed via a URL and the sender 305 may be directed to a web page associated with the URL. The web page may be part of a web site associated with the payment facilitator 315. The sender 305 may need to log in. This is illustrated in block 610. At block 615, the sender 305 reviews the details of the pre-approval request. At block 620, the sender 305 may provide the pre-approval. Having the pre-approval may allow the receiver 310 to receive future payments without having to submit a pay request.

For some example embodiments, a pre-approval provided by the sender 305 may be canceled by the sender 305. This may be performed via a pre-approval management interface of the payment facilitator 315. The pre-approval management interface may list all the pre-approvals provided by the sender 305. The pre-approval management interface may enable the sender 305 to select and to cancel one or more pre-approvals.

The pre-approval flows may be different from the normal approval flows because the approval phase takes place before the pay phase and because a single pre-approval can be applied to multiple payments. The pre-approval flows may be applied to many different payment scenarios (e.g., split payment, checkout, send payment, etc.). Following are some example constraints that can be applied to a pre-approval flow:

Max amount per execution
Max amount for all executions (sum)
Total number of times this pre-approval can be used to process a payment.
The frequency of use (per day, month, and year)
Expiration date
Specify a receiver (by email address)
Specify the sender or receiver to pay the fees The max amount and the expiration date parameters may be used to reduce the risk involved in payment transactions associated with the pre-approval flows.

Send Money Application

Figure 7:
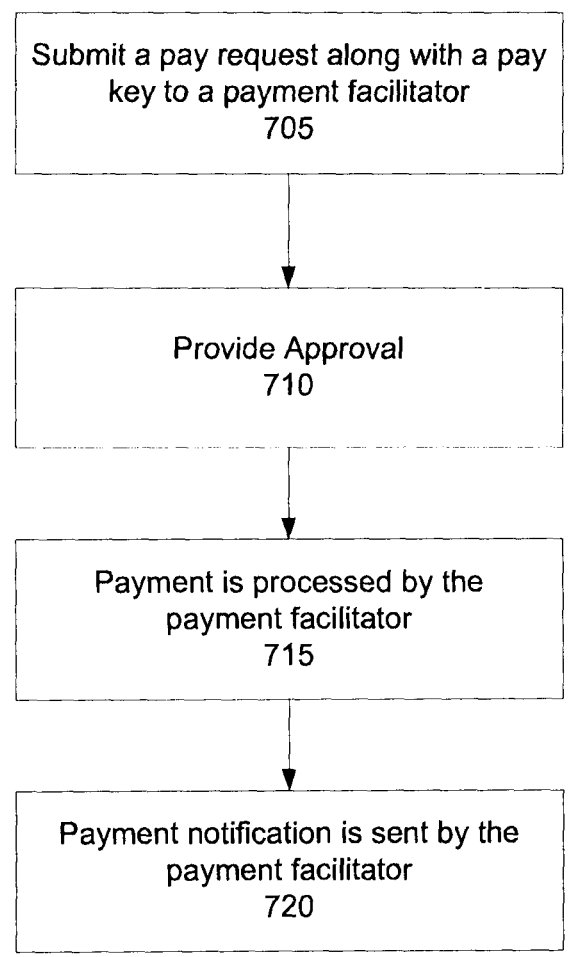
FIG. 7 illustrates an example of a send money scenario using the payment application framework, in accordance with some example embodiments.

FIG. 7 illustrates an example of a send money scenario, in accordance with some example embodiments. In this scenario, the sender 305 wants to initiate a payment transaction to send money from the sender's account with the payment facilitator to a receiver 310. A send money scenario is often associated with peer-to-peer transactions and may or may not need pre-approval.

At block 705, the sender 305 sends in a pay request. The sender 305 may need to have access to the payment facilitator 315 to submit the pay request. In this example, the sender 305 may be either the actual account holder or someone who has rights to access the account of behalf of the sender 305. The payment facilitator 315 processes the pay request and generates a pay key.

The sender 305 is then directed to an approval interface by the approval flow with the pay key as a parameter. This may be though a web page redirect, email, SMS message, or any other method that may include the sending a URL. The approval interface may be associated with the payment facilitator 315. Based on the sender 305 providing the approval, the payment is processed, as illustrated in blocks 710 and 715. Optionally, if notification is requested and specified in the pay request, a notification message may be sent to the receiver 310 and/or the sender 305.

An example of a send money scenario may include making an online payment for a utility bill. During the pay phase, a person (sender) visiting a web site of a utility company (receiver) to make a payment for the utility bill. The web site of the utility company may make a programming call (pay request) with the details of the payment to the payment facilitator. A pay key is generated. The pay key may be sent to the utility company. During the approval phase, the person is redirected from the web site of the utility company to a web site of a payment facilitator (e.g., PayPal) with the pay key and a redirect URL as parameters. The person is taken through an approval flow and approves the payment. The person is then redirected back to the web site of the utility company using the URL parameter. Payment is then transferred from the person's account to an account of the utility company. The account of the utility company may be with the payment facilitator.

It may be noted that this example covers a send money scenario, and thus it may not be necessary to perform any reserve funds functions. However, if the reserve funds functions are required, this information would be included in the pay request. The reserve funds would then be performed after the approval is provided. Subsequently, recapture functions may need to be performed to transfer the funds from the person's account with the payment facilitator.

The utility company may also want to use the pay status functions to check on the status of the payment. This may be performed by making another programming call to the payment facilitator to check on the pay status of the payment. The programming call includes the pay key as a parameter, and the return status from the programming call may include approval information and funds transfer information. A payment notification may be sent to the utility company web site if the notification option is included in the pay request.

In certain situations, the send money scenarios may be associated with the pre-approval flow. These scenarios may be referred to as pre-approval send money. This may occur when a sender provides the pre-approval and access to send money from the sender's account in the future with restrictions. The sender 305 may create a pre-approval request with constraints of the payment and send the request to the payment facilitator 315. A pre-approval key is then generated by the payment facilitator 315, and the sender 305 is taken through the pre-approval flow to view and create an agreement for the pre-approval payments. Subsequently, the sender 305 (or someone acting on the sender's behalf) may submit a pay request and send the pay request along with the pre-approval key to the payment facilitator 315. Based on the sender providing the approval, the payment is transferred. A notification may also be included in the pay request to notify the sender 305 when the payment is transferred.

Checkout Application

Figure 8:
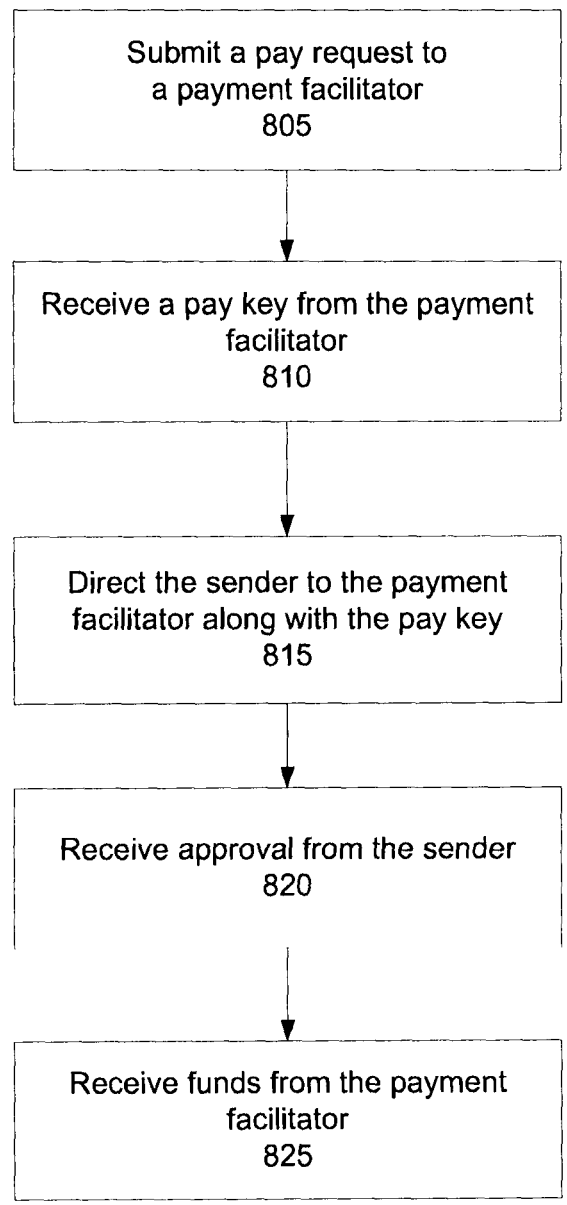
FIG. 8 illustrates an example of a checkout scenario using the payment application framework, in accordance with some example embodiments.

FIG. 8 illustrates an example of a checkout scenario using the payment application framework, in accordance with some example embodiments. A checkout scenario may differ from a send money scenario because it is usually initiated by the receiver 310. The checkout scenarios may be referred to as merchant flows or ecommerce transactions. Another difference between the checkout scenario and the send money scenario is that the send money scenario involves less interaction between the sender 305 and the receiver 310 than a checkout scenario. In the checkout scenario, it is assumed that either digital goods or goods available to ship immediately are available.

In this scenario, a consumer (sender 305) may indicate to a merchant (receiver 310) at a merchant's web site that the consumer wants to make a purchase. A common example would include the consumer filling a shopping cart on the merchant's website and selecting a checkout cart. The merchant then creates a pay request and send it to payment facilitator 315, as illustrated in block 805.

At block 810, a pay key is received from the payment facilitator 315. The merchant then redirect the consumer to the web site of the payment facilitator 315 with the pay key as a parameter, as illustrated in block 815. The consumer is taken through an approval flow and approves the payment, as illustrated in block 820. The fund is then transferred to the merchant, as illustrated in block 825.

In certain situations, the checkout scenarios may be associated with a pre-approval flow, referred to as pre-approval checkout. This occurs when a consumer (sender) and a merchant (receiver) agree to a pre-approval payment scenario by, for example, filling out a form on the web site of the merchant. The merchant then creates a pre-approval request with the constraints of the payment and then sends it to the payment facilitator 315. A pre-approval key is received from the payment facilitator 315. The consumer is then redirected to the payment facilitator 315 and taken through a pre-approval flow. The consumer then views and creates the agreement to the pre-approval payments. Subsequently, the merchant may generate a pay request and send the pay request with the pre-approval key to the payment facilitator 315 for payments. A pay key may be sent to the merchant by the payment facilitator 315.

Split Payments

Figure 9A:
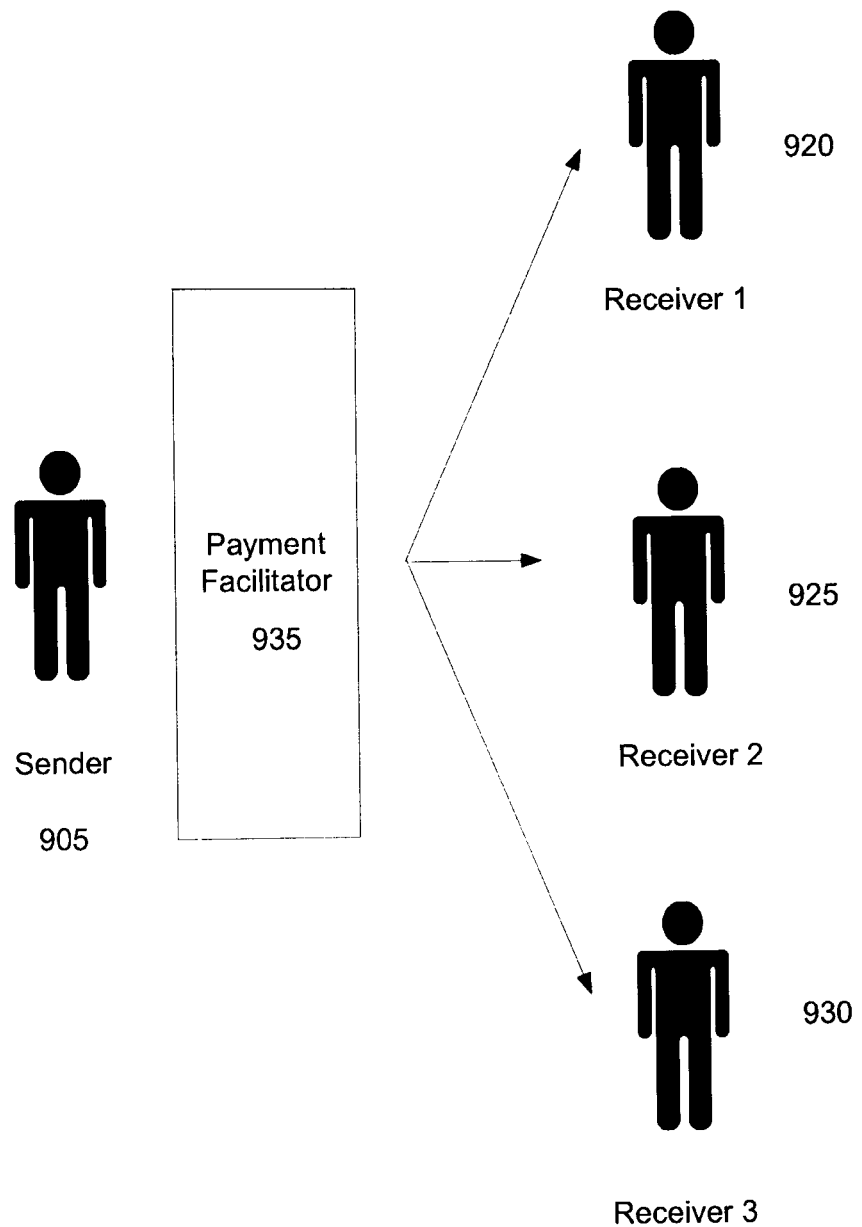
FIGS. 9A-B illustrate diagrams that illustrate examples of parallel payments and chained payments, in accordance with some example embodiments.
Figure 9B:
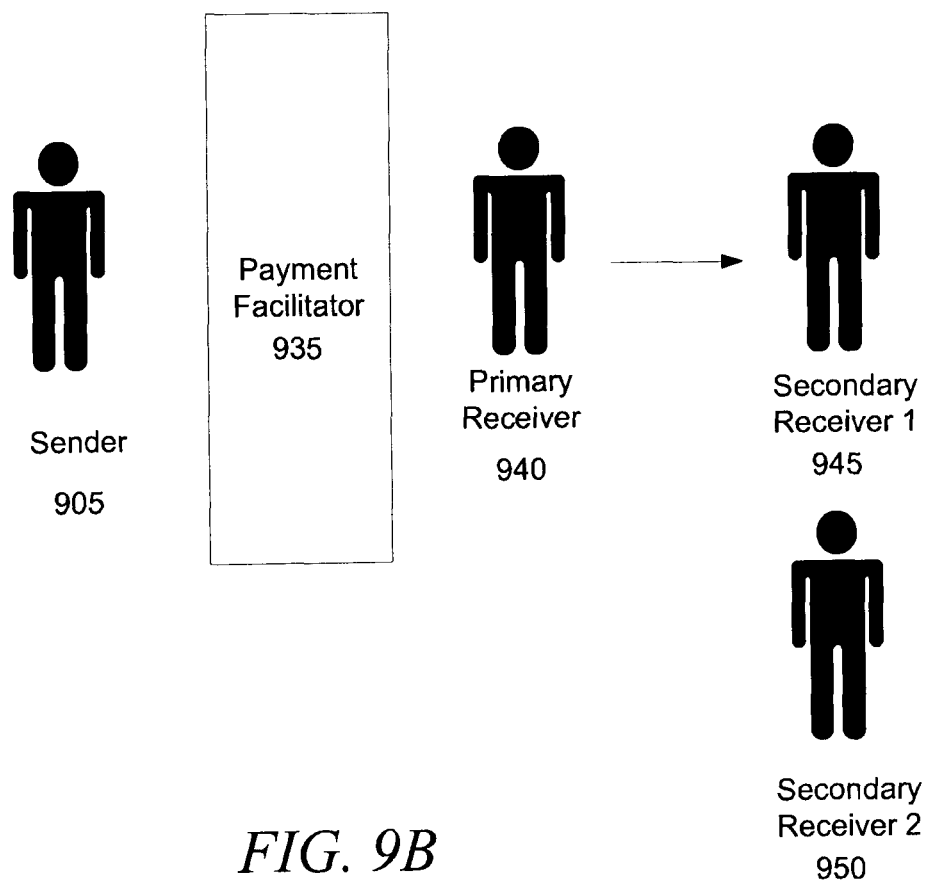

FIGS. 9A-9B illustrate examples of split payment scenarios, in accordance with some example embodiments. A split payment scenario provides the ability for a single payment to be divided amongst multiple receivers(s). In this situation, there may be multiple payment transactions but only a single pay key. The split payment scenario may include parallel payment scenarios (illustrated in FIG. 9A) and chained payment scenarios (illustrated in FIG. 9B).

Referring to FIG. 9A, a single pay request may be used to transfer funds from one sender 905 to multiple receivers 920-930. In this example, since there are three receivers 920, 925 and 930, there may be three separate transactions. In parallel payments, it may not be necessary to designate a primary receiver. The sender 905 or any of the receivers 920-930 can initiate the pay request. This is advantageous in situations when one receiver desires to make a pay request with a reserve funds function while another receiver is designated to use the capture function. When it is time for the sender to review the pay request and to provide the approval, all segments or transactions within a parallel payment may need to be visible for the sender 905 to approve. Accordingly, the receivers 920-930 are the merchants of record for all parallel payment scenarios.

An example of a parallel payment scenario includes a consumer who purchases goods/services from multiple vendors in a shopping mall and pay for the goods/services in one checkout flow. The sender 905 (consumer) may be redirected to a payment facilitator 935 and may only need to provide one approval even though there are multiple receivers 920-930 (vendors) involved. When the approval is provided by the sender 905, the funds may be transferred to the accounts of each of the receivers 920-930. It may be noted that the approval flow in the parallel payment scenarios with multiple receivers may involve the same operations (e.g., pay request, pay key, redirecting, approval, and payment) as the approval flow for a single receiver. The difference is that the payments are split to three receives in the parallel payment scenarios. The details of how much to pay each of the receivers 920-930 may be included in the parameters of the pay request and is based on the cost of the items purchased from the particular vendor. In the situation when one of the receivers 920-930 needs to cancel an item, a refund is processed for the amount associated with the item being canceled. In the situation when one of the payment transactions fails (e.g., due to insufficient funds), then a default action may include reversing or rolling back all payment transactions.

Referring to FIG. 9B, the chained payment scenario may be different than the parallel payment scenario because of the special circumstances surrounding refunds, fees, and funds movement. This is because the movement of the funds to the primary receiver may need to happen before the funds are transmitted to the additional receivers. The chained payment scenarios may include a primary receiver 940 who first receives all of the funds for the payment transaction. After the payment transaction completes, the funds are then moved into one or more secondary receiver's accounts. For some example embodiments, the chained payment scenario may only have a single primary receiver 940 sending to a single group of additional receivers 945-950. For some example embodiments, a limit may be placed on a number of receivers (primary and secondary receivers) for any given pay request. The sender 905 of the payment transaction in a chained payment scenario may only see the primary receiver 940 in the approval flow and any payment transaction history. Accordingly, the primary receiver 940 is the merchant of record for all chained payment scenarios.

An example of a chained payment scenario includes a broker who receives funds on behalf of the service providers. The broker is the primary receiver 940, and the service providers are the secondary receivers 945-950. An example of a broker may be Travelocity.com which provides authorization for all aspects of a travel package including airline portion, hotel portion, event portion, etc. Each of these portions may be associated with a different service provider. The secondary receivers 945-950 may need to provide the primary receiver 940 third-party access to their accounts in order to transfer payments into their accounts. This may also allow the primary receiver to issue refunds to the sender 905 on behalf of the secondary receivers 945-950.

During the pay phase, the sender 905 (consumer) visits the web site of the primary receiver 940 (e.g., Travelocity.com). The sender 905 selects a package that includes the services (e.g., hotel, car rental, flight insurance, tour packages, etc.) provided by the secondary receivers 945-950. The primary receiver 940 creates a pay request and sends the pay request to the payment facilitator 935. A pay key is generated and provided by the payment facilitator 935 to the primary receiver 940.

During the approval phase, the primary receiver 940 redirects the sender 905 to the payment facilitator 905. The sender 905 reviews the pay request and provides the approval based on an approval flow. The pay key is sent along with a redirect URL to return to the web site of the primary receiver 940. Based on the sender 905 approving the payment, the sender 905 is redirected back to the web site of the primary receiver 940 using the redirect URL. The funds are then transferred from the sender's account to the account of the primary receiver 940. The funds are then sent from the account of the primary receiver 940 to the accounts of the secondary receivers 945-950. It may be noted that all of these accounts may be associated with the payment facilitator 905.

Computer System

Figure 10:
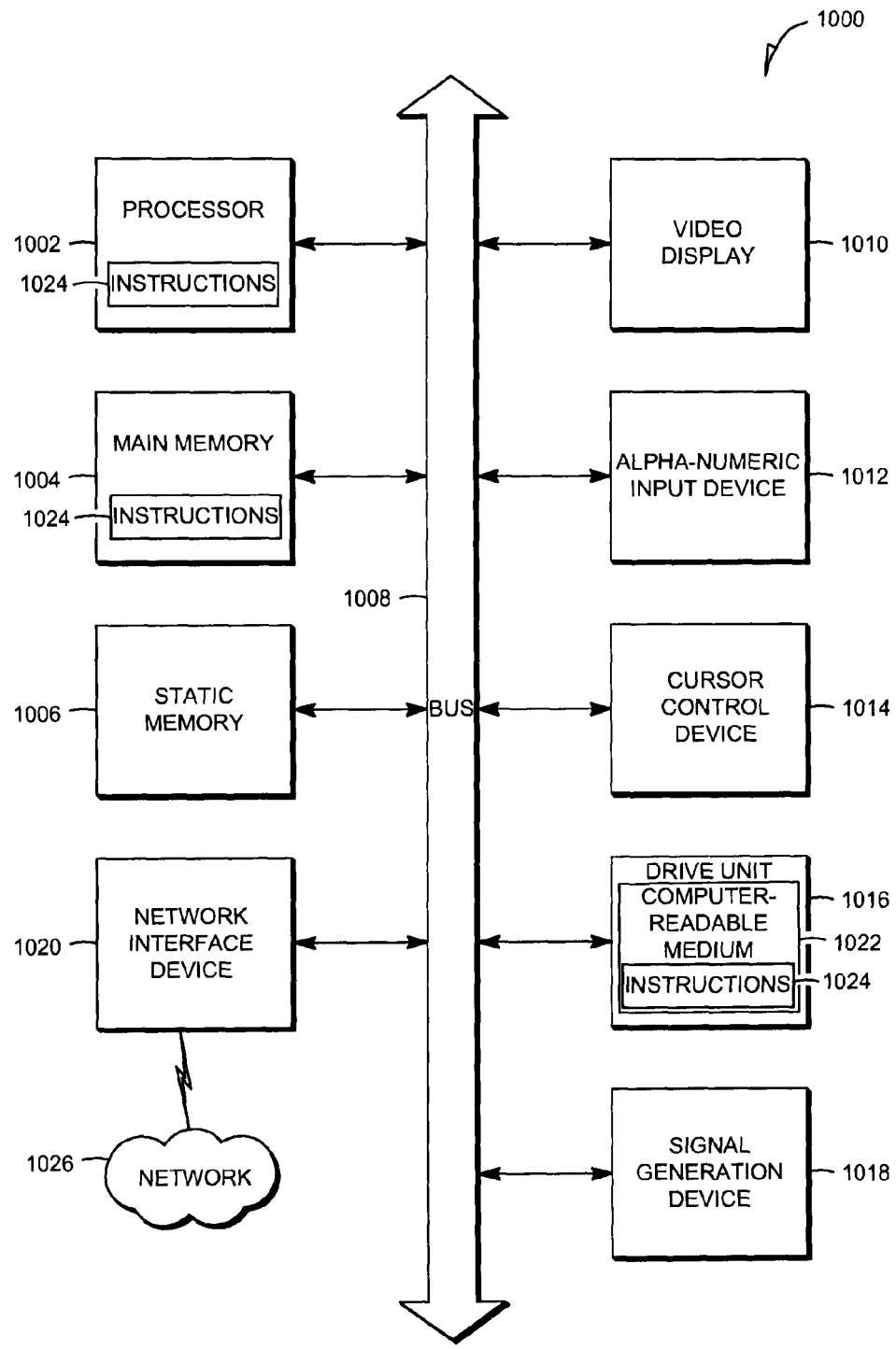
FIG. 10 illustrates a diagrammatic representation of a machine in the form of a computer system within which a set of instructions, for causing the machine to perform any one or more of the methodologies discussed herein, may be executed, according to an example embodiment.

FIG. 10 shows a diagrammatic representation of a machine in the example form of a computer system 1000 within which a set of instructions, for causing the machine to automatically perform any one or more of the methodologies discussed herein, may be executed. In alternative embodiments, the machine operates as a standalone device or may be connected (e.g., network) to other machines. In a network deployment, the machine may operate in the capacity of a server or a client user machine in server-client user network environment, or as a peer machine in a peer-to-peer (or distributed) network environment. The machine may be a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a landline telephone, a control system, a camera, a scanner, a facsimile machine, a printer, a television, television cable a pager, a personal trusted device, a web appliance, a network router, switch or bridge, or any machine capable of executing a set of instructions (sequential or otherwise) that specify actions to be taken by that machine.

Further, while a single machine is illustrated, the term "machine" shall also be taken to include any collection of machines that individually or jointly execute a set (or multiple sets) of electronically-coded instructions to perform any one or more of the methodologies discussed herein.

The example computer system 800 includes a processor 1002 (e.g., a central processing unit (CPU), a graphics processing unit (GPU), or both), a main memory 1004 and a static memory 1006, which communicate with each other via a bus 808. The computer system 1000 may further include a video display unit 1010 (e.g., a liquid crystal displays (LCD) or a cathode ray tube (CRT)). The computer system 1000 also includes an input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of electronically-coded instructions (e.g., software 1024) embodying any one or more of the methodologies or functions described herein. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media.

The instructions 1024 may further be transmitted or received over a network 1026 via the network interface device 1020.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. FIGS. 1 to 10 are merely representational and may not be drawn to scale. Certain proportions thereof may be exaggerated, while others may be minimized.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims. In the Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

What is claimed is:

1. A method comprising:

receiving a request at a payment facilitator, the request associated with one or more payment transactions to transfer funds from a sender to a plurality of receiving parties;

processing the request to establish the one or more payment transactions;

initiating, using one or more processors, a single transfer of the funds from an account of the sender to an account of a primary receiving party of the plurality of receiving parties; and transferring a first portion of the funds that were received from the account of the sender from the account of the primary receiving party to at least one account of a secondary receiving party of the plurality of receiving parties based solely on details within the request, a second portion resulting from the transferring of the first portion of the funds remaining in the account of the primary receiving party as payment to the primary receiving party.

2. The method of claim 1, wherein the initiating the single transfer of the funds comprises transferring the funds to an account of more than one primary receiving parties of the plurality of receiving parties.

3. The method of claim 1, wherein the single transfer of the funds from the account of the sender comprises a single withdrawal of funds for payment to the plurality of receiving parties.

4. The method of claim 2, wherein the initiating the single transfer of funds comprises transferring the funds to the accounts of the more than one primary receiving parties in parallel.

5. The method of claim 1, wherein the account of the sender is funded by a credit card.

6. The method of claim 1, wherein the account of the sender is funded by a savings or checking account.

7. The method of claim 1, wherein the account of the sender is funded by a debit card.

8. The method of claim 1, wherein the account of the sender is funded by a line of credit.

9. The method of claim 1, further comprising receiving an approval from the sender, the approval causing the funds to be sent to the account of the primary receiving party and at least one account of the secondary receiving party of the plurality of receiving parties.

10. The method of claim 1, further comprising:
directing the sender to a website associated with the payment facilitator;
presenting details associated with the request to the sender for review; and
receiving an indication of approval of the transfer of funds based on the presented details associated with request.

11. A non-transitory machine-readable storage medium in communication with at least one processor, the machine-readable storage medium storing instructions which, when executed by the at least one processor causes the processor to perform operations comprising:
receiving a request at a payment facilitator, the request associated with one or more payment transactions to transfer funds from a sender to a plurality of receiving parties;
processing the request to establish the one or more payment transactions;
initiating a single transfer of the funds from an account of the sender to an account of a primary receiving party of the plurality of receiving parties; and
transferring a first portion of the funds that were received from the account of the sender from the account of the primary receiving party to at least one account of a secondary receiving party of the plurality of receiving parties based solely on details within the request, a second portion resulting from the transferring of the first portion of the funds remaining in the account of the primary receiving party as payment to the primary receiving party.

12. The non-transitory machine-readable storage medium of claim 11, wherein the initiating the single transfer of the funds comprises transferring the funds to an account of more than one primary receiving parties of the plurality of receiving parties.

13. The non-transitory machine-readable storage medium of claim 12, wherein the single transfer of the funds from the account of the sender comprises a single withdrawal of funds for payment to the plurality of receiving parties.

14. The non-transitory machine-readable storage medium of claim 12, wherein the initiating the single transfer of funds comprises transferring the funds to the accounts of the more than one primary receiving parties in parallel.

15. A method comprising:
receiving a transfer of funds, from an account of a sender, into an account of a primary receiving party of a plurality of receiving parties based on a pay request, the transfer of funds in connection with at least one transaction of the pay request and to be split among the plurality of receiving parties; and
automatically transferring, using one or more processors, a first portion of the transferred funds that were received from the account of the sender from the account of the primary receiving party to respective accounts of one or more secondary receiving parties of the plurality of receiving parties based solely on details within the pay request, a second portion resulting from the transferring of the first portion of the funds remaining in the account of the primary receiving party as payment to the primary receiving party.

16. The method of claim 15, wherein the account of the sender is funded by a credit card.

17. The method of claim 15, wherein the account of the sender is funded by a savings or checking account.

18. The method of claim 15, wherein the account of the sender is funded by a debit card.

19. The method of claim 15, wherein the account of the sender is funded by a line of credit.

20. The method of claim 15, further comprising receiving an approval from the sender, the approval causing the funds to be sent to the account of the primary receiving party and the accounts of one or more secondary receiving parties of the plurality of receiving parties.

21. The method of claim 15, further comprising:
directing the sender to a website associated with the payment facilitator;
presenting details associated with the request to the sender for review; and
receiving an indication of approval of the transfer of funds based on the presented details associated with request.

22. A non-transitory machine-readable storage medium in communication with at least one processor, the machine-readable storage medium storing instructions which, when executed by the at least one processor of a machine, cause the machine to perform operations comprising:
receiving a transfer of funds, from an account of a sender, into an account of a primary receiving party of a plurality of receiving parties based on a pay request, the transfer of funds in connection with at least one transaction of the pay request and to be split among the plurality of receiving parties; and
automatically transferring a first portion of the transferred funds that were received from the account of the sender from the account of the primary receiving party to respective accounts of one or more secondary receiving parties of the plurality of receiving parties based solely on details within the pay request, a second portion resulting from the transferring of the first portion of the funds remaining in the account of the primary receiving party as payment to the primary receiving party.

* * * * *